(12) United States Patent
Kobayashi et al.

(10) Patent No.: US 8,659,245 B2
(45) Date of Patent: Feb. 25, 2014

(54) ACTIVE VIBRATION CONTROL APPARATUS

(75) Inventors: Yasunori Kobayashi, Wako (JP); Toshio Inoue, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 291 days.

(21) Appl. No.: 13/204,570

(22) Filed: Aug. 5, 2011

(65) Prior Publication Data

US 2012/0032619 A1 Feb. 9, 2012

(30) Foreign Application Priority Data

Aug. 6, 2010 (JP) ................................ 2010-177849

(51) Int. Cl.
*H02K 41/00* (2006.01)

(52) U.S. Cl.
USPC ............................ 318/135; 318/128; 318/114

(58) Field of Classification Search
USPC ......... 318/135, 128, 114, 119, 459, 500, 649; 310/12, 13
See application file for complete search history.

(56) References Cited

U.S. PATENT DOCUMENTS

| 2008/0036303 A1* | 2/2008 | Stevens | 310/12 |
| 2012/0293094 A1* | 11/2012 | Moriya et al. | 318/135 |

FOREIGN PATENT DOCUMENTS

| JP | 06-74293 | 3/1994 |
| JP | 2006-300318 | 11/2006 |
| JP | 2006-345652 | 12/2006 |

\* cited by examiner

*Primary Examiner* — Karen Masih
(74) *Attorney, Agent, or Firm* — Ditthavong Mori & Steiner, P.C.

(57) ABSTRACT

An active vibration control apparatus includes a linear actuator and a controller. The linear actuator includes a moving element, a stator and an elastic support. The stator has a plurality of coils surrounding the moving element. The elastic support supports the moving element to be reciprocally movable relative to the stator in an axial direction of the moving element due to elastic deformation of the elastic support. The controller is configured to apply an alternating current to the stator to generate vibration due to relative displacement of the moving element and the stator in the axial direction. The controller is configured to correct a center position of an amplitude of the vibration by additionally applying a predetermined direct current as a biased current to the stator when the linear actuator satisfies a predetermined vibration condition.

6 Claims, 13 Drawing Sheets

ACTIVE VIBRATION CONTROL APPARATUS

CROSS-REFERENCE TO RELATED APPLICATIONS

The present application claims priority under 35 U.S.C. §119 to Japanese Patent Application No. 2010-177849 filed Aug. 6, 2010, entitled "Active Vibration Control Apparatus". The contents of this application are incorporated herein by reference in their entirety.

BACKGROUND OF THE INVENTION

1. Field of the Invention

The present invention relates to an active vibration control apparatus.

2. Discussion of the Background

For example, there is a known anti-vibration apparatus including an engine mount that supports an engine on a vehicle body and restricts the transmission of vibration from the engine to the vehicle body; the anti-vibration function of the anti-vibration apparatus is improved by reducing the vibration of the vehicle body with damping vibration generated at the linear actuator attached to the vehicle body (for example, refer to Japanese Unexamined Patent Application Publication No. 2006-300318).

A known linear actuator causing a reciprocal movement may include a stator and a moving element that moves relative with the stator (for example refer to Japanese Unexamined Patent Application Publication No. 2006-345652).

Japanese Unexamined Patent Application Publication No. 6-74293 describes a technique associated with a vibration/noise control device for vehicles that attenuates vibration generated from a vibrating body and reduces vibration using an adaptive digital filter.

According to the related art described in Japanese Unexamined Patent Application Publication No. 2006-345652, when attaching the moving element of the linear actuator in such a manner that it is movable in the vertical direction, unless it is maintained at the center of the vertical displacement range (neutral position), maximum displacement may not be achieved.

SUMMARY OF THE INVENTION

According to one aspect of the present invention, an active vibration control apparatus includes a linear actuator and a controller. The linear actuator includes a moving element, a stator and an elastic support. The stator has a plurality of coils surrounding the moving element. The elastic support supports the moving element to be reciprocally movable relative to the stator in an axial direction of the moving element due to elastic deformation of the elastic support. The controller is configured to apply an alternating current to the stator to generate vibration due to relative displacement of the moving element and the stator in the axial direction. The controller is configured to correct a center position of an amplitude of the vibration by additionally applying a predetermined direct current as a biased current to the stator when the linear actuator satisfies a predetermined vibration condition.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENTS

Figure 1:
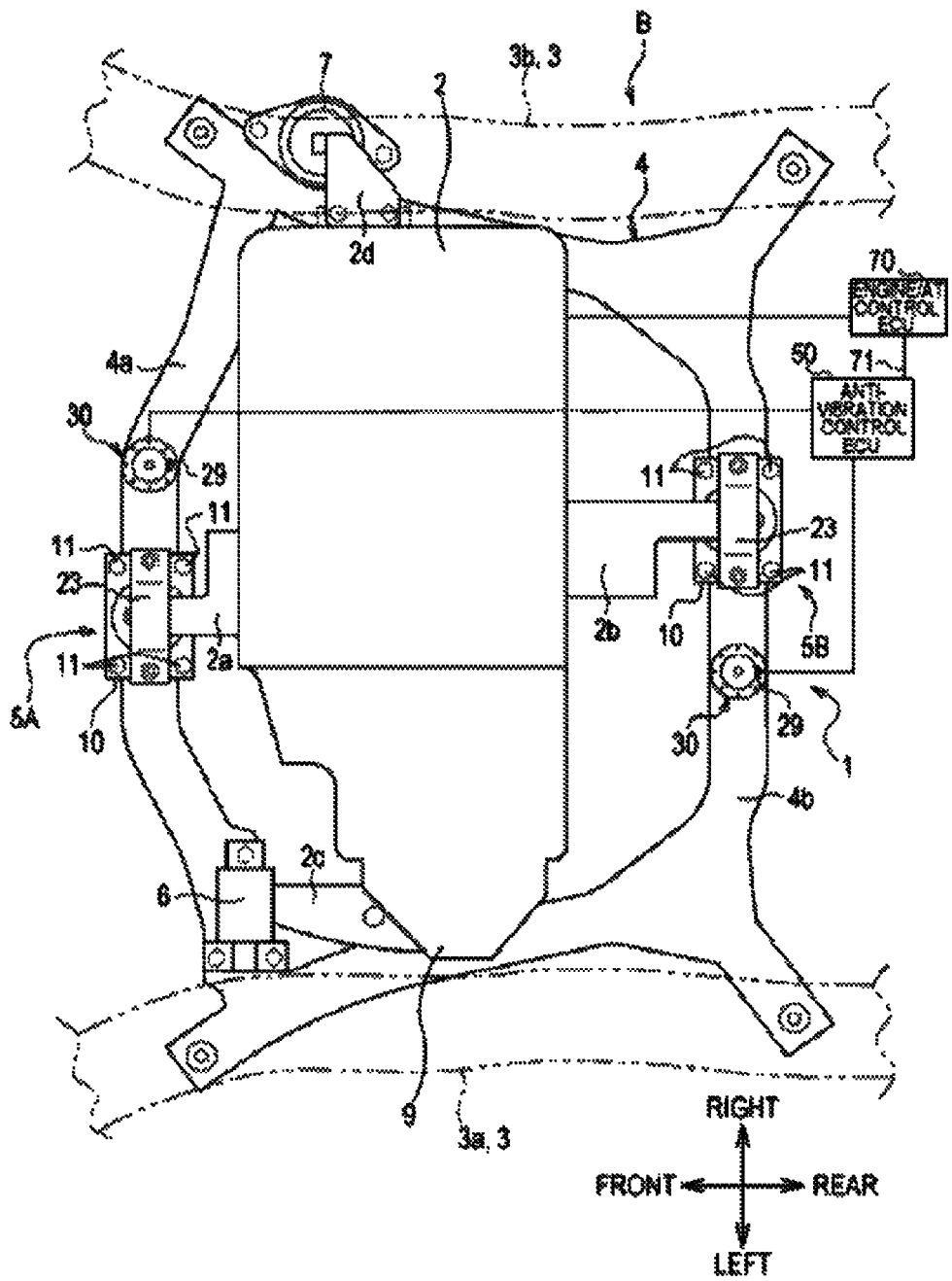
FIG. 1 is a plan view of essential parts of an active vibration control apparatus mounted on a vehicle body.

The embodiments will now be described with reference to the accompanying drawings, wherein like reference numerals designate corresponding or identical elements throughout the various drawings.

The known path through which vibration generated at the engine, which is a vibrating body, in a vehicle is transmitted to a passenger as vehicle interior vibration and vehicle interior sound will be described with reference to FIG. 12.

Figure 12:
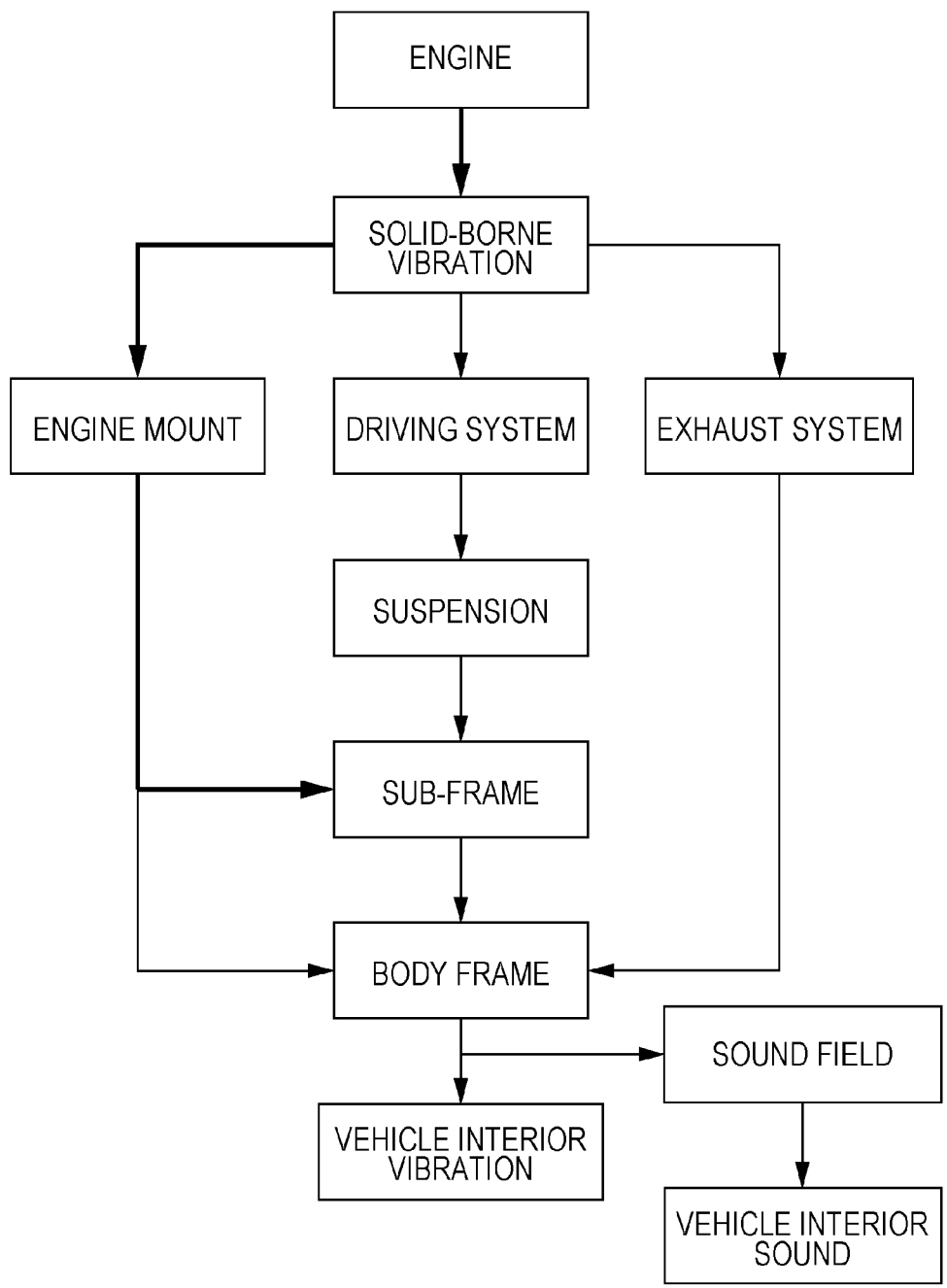
FIG. 12 illustrates the path through which the vibration generated at an engine, which is a vibrating body, is transmitted as vehicle interior vibration and vehicle interior sound.

FIG. 12 illustrates the path through which the vibration generated at the engine, which is a vibrating body, is transmitted as vehicle interior vibration and vehicle interior sound.

In FIG. 12, the thickest arrows represent the main paths of the vibration generated at the engine transmitted as vehicle interior vibration; the second thickest arrows represent the main paths in the next level; and the least thick arrow represents a path through which vibration is the least transmitted.

As represented in FIG. 12 by the thickest arrows, the vibration generated at the engine is transmitted through a first main path to the transmission via solid borne transmission. The vibration of the engine and the transmission is partially absorbed and attenuated by an engine mount and is further transmitted to the sub-frame and the body frame. The vibration is finally transmitted as vehicle interior sound.

As illustrated in FIG. 12 with the second thickest arrows, the vibration generated at the engine is transmitted through a second main path through the transmission, a driving system, which includes a drive shaft, etc., a suspension, a sub-frame, and the body frame and is finally transmitted as vehicle interior vibration.

As represented in FIG. 12 with the least thickest arrow, the vibration generated at the engine is transmitted to the body frame via solid borne transmission through an exhaust pipe connected to the engine and the exhaust system.

When the body frame vibrates, the vibration is not only sensed by a passenger as vehicle interior vibration, which is indicated by the second thickest arrows, but also as vehicle interior sound (vehicle interior noise) in which the interior air functions as a sound field.

An active vibration control apparatus according to an embodiment of the reference invention will be described below with reference to FIGS. 1 to 5. The active vibration control apparatus cancels out vibration transmitted from the engine, which is vibrating body, by actively vibrating members of the sub-frame of the vehicle body with a linear actuator when vibration is transmitted to the sub-frame.

FIG. 1 is a plan view of essential parts of an active vibration control apparatus mounted on a vehicle body.

Figure 2:
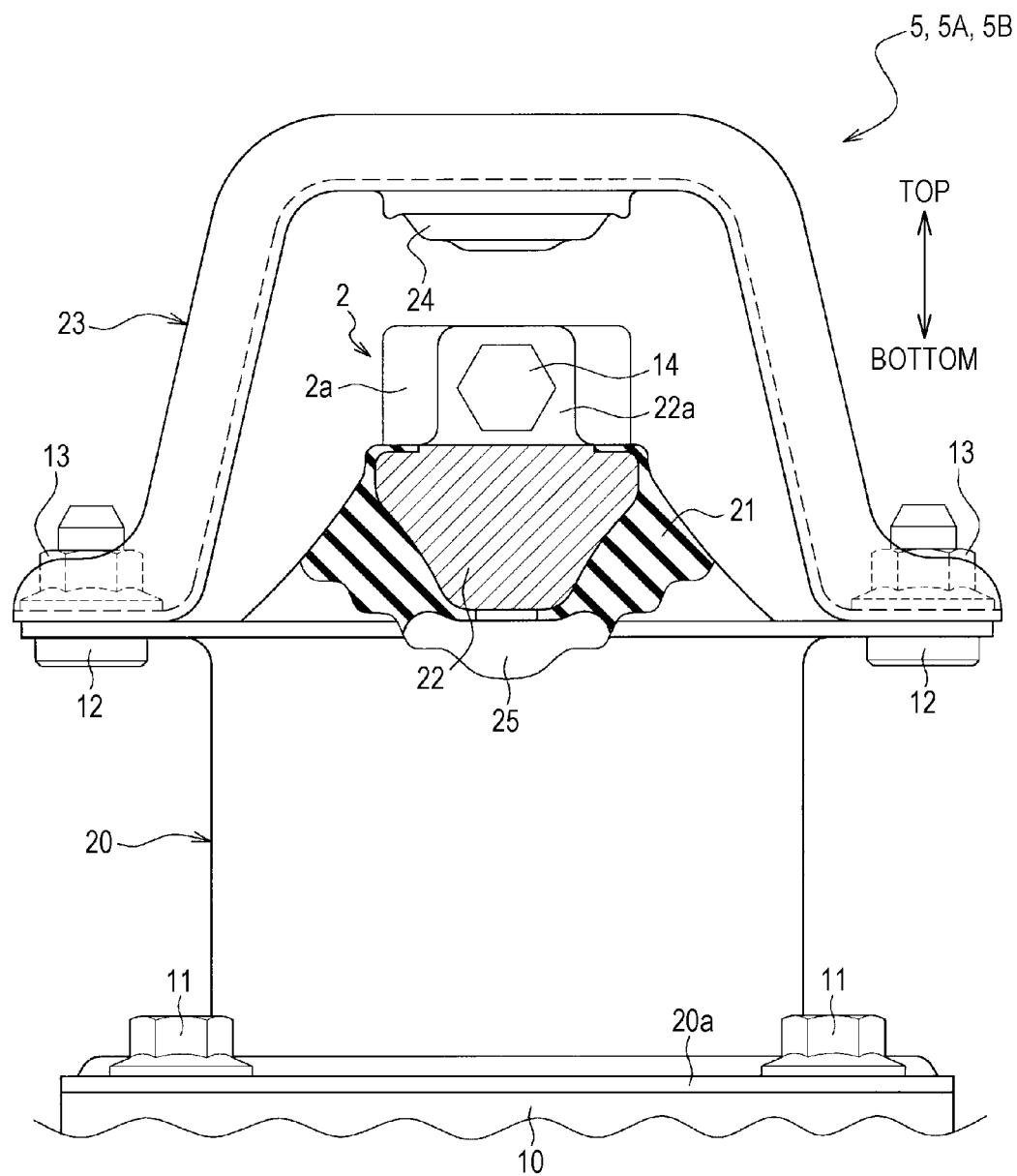
FIG. 2 is a partially cutaway sectional view of an engine mount.

FIG. 2 is a partially cutaway sectional view of an engine mount.

As illustrated in FIG. 1, the active vibration control apparatus 1 according to this embodiment of the present invention is mounted on a vehicle, which is capable of being equipped with the apparatus.

The vehicle includes two engine mounts 5A and 5B, which support an engine 2 on a vehicle body B, two more engines mounts 6 and 7, linear actuators 30, which generate damping vibration, an anti-vibration control electronic control unit (ECU) 50, which controls the linear actuators 30, and an engine/automatic transmission (AT) control ECU (control device controlling the shift position of the transmission) 70, which controls the engine 2 and the gearbox 9, which is automatic transmission.

The anti-vibration control ECU 50 is equivalent to a control unit according to the embodiment of the present invention.

For example, the gearbox 9 is configured such that the output shaft of the engine 2 is input to a torque converter (not shown), and then the pairs of transmission gears and/or reverse gears are engages by a hydraulic clutch.

The hydraulic clutch is operated by controlling a hydraulic circuit (not shown) with the engine/AT control ECU 70.

The engine/AT control ECU 70 receives various signals for controlling the engine 2 from an accelerator-position sensor detecting the depression of an accelerator pedal (not shown), a throttle-valve-position sensor detecting the opening of the throttle valve, an air flowmeter detecting the intake through the intake pipe of the engine 2, an intake temperature sensor, a water-temperature sensor detecting the temperature of the engine cooling water, an $O_2$ sensor detecting the amount of oxygen in the exhaust gas, a crank sensor detecting a crank pulse, a top-dead-center (TDC) sensor detecting the top dead center of each cylinder, etc.

The engine/AT control ECU 70 outputs to the engine, a control signal to the throttle valve and actuators for controlling the opening of the throttle valve (not shown), an injection signal to the fuel injection valve in each cylinder, power feeding to the solenoid that stops operation of part of the cylinders, high voltage from the igniter circuit controlling the ignition of each cylinder, etc.

The engine/AT control ECU 70 also receives, for example, a signal from a selected-position sensor of a selecting device (not shown) used to select a position (parking range, reverse range, neutral range, drive range, etc.) of the gearbox 9 disposed between the driving seat and the passenger seat and an echo mode signal transmitted when an echo-mode selection button (not shown) on an instrument panel is pressed.

The gearbox 9 outputs to the hydraulic circuit (not shown) via the engine/AT control ECU 70, a signal for changing the shift position and a signal for moving or releasing the lockup clutch of the torque converter.

There are vehicles known to automatically shift gear in different ways in a normal mode and an echo mode.

In the echo mode, the shift position of the gearbox 9 is shifted up at smaller engine rotational speed compared with that in the normal mode. When the echo-mode selection button on the instrument panel is pressed by the driver to select the echo mode, the shift position is automatically changed with a variation range of the engine rotational speed that is smaller than that in the normal mode.

The engine 2 is a multi-cylinder four stroke engine; the engine 2 is laterally disposed in such a manner that a crank shaft (not shown), which is rotationally driven by a reciprocating piston (not shown), is disposed in the left-to-right direction of the vehicle body B and is supported by the frame of the vehicle body B, which is a vibration receiving unit.

The engine 2 is connected to the gearbox 9 which receives the rotation of the crank shaft, and power varied at the gearbox 9 is transmitted to the front wheels (not shown), which are the drive wheels.

The engine 2 and the gearbox 9 constitute a power plant.

As illustrated in FIG. 1, the vehicle body B includes a vehicle body frame that has paired side frames 3a and 3b, which respectively constitute the left and right sides of a main frame 3, and a sub-frame 4 that is connected to the side frames 3a and 3b from below.

The sub-frame 4 having a rectangular frame structure includes a first frame 4a and a second frame 4b, which are disposed apart from each other in the front-to-rear direction and connected to the side frames 3a and 3b.

The engine 2 is attached to the first frame 4a with an engine mount 5A at a connecting part 2a and is attached to the second frame 4b with an engine mounts 5B at a connecting part 2b. The engine is attached to the first frame 4a with an engine mount 6 at a connecting part 2c on the gearbox 9, which is a member secured integrally with the engine 2 on the left part of the engine 2 and is attached to the right side frame 3b with an engine mount 7 at a connecting part 2d on the right part of the engine 2.

Accordingly, the vehicle body B supports the engine 2 with the engine mounts 5A, 5B, 6, and 7.

The engine mounts 5A, 5B, 6, and 7 prevent engine vibration generated by a periodical torque variation corresponding to the engine rotational speed, which is the rotational speed of the crank shaft, as a result of the movement of pistons, which are components of the engine 2, from being transmitted to the sub-frame 4 and the main frame 3.

The linear actuators 30 are secured to the upper sides of the first and second frames 4a and 4b of the sub-frame 4 near the engine mounts 5A and 5B, respectively.

The linear actuators 30 are controlled by the anti-vibration control ECU 50 so as to generate vibration that cancels out the vibration of the engine 2 transmitted to the first and second frames 4a and 4b and transmit this vibration for canceling out to the first and second frames 4a and 4b.

Vibration sensors 29 are disposed on the linear actuators 30.

Harnesses and signal lines of vibration sensors 29 that supply power to coils 40 (see FIG. 4) of the linear actuators 30 are connected to the anti-vibration control ECU 50.

The engine/AT control ECU 70 and the anti-vibration control ECU 50 are connected to each other with a control area network (CAN) communication line 71 and can communicate with each other.

The linear actuators 30 and the anti-vibration control ECU 50 constitute the active vibration control apparatus 1.

Engine Mounts

The engine mounts 5A and 5B will be described with reference to FIG. 1 and occasionally with reference to FIG. 2.

The paired engine mounts 5A and 5B supporting the engine 2 at the front and rear parts of the engine 2 (see FIG. 1) mainly prevent roll vibration among the different types of vibration at the engine from being transmitted to the first and second frames 4a and 4b (see FIG. 1).

The engine mounts 5A and 5B are respectively secured to the attachment seats 10 integrated with the frames 4a and 4b with bolts 11. Instead, however, the engine mounts 5A and 5B may respectively be directly attached to the first frames 4a and 4b with the attachment seats 10.

Since the basic structure of the engine mounts 5A and 5B is the same, as illustrated in FIG. 2, the engine mounts 5A and 5B will be collectively referred to as engine mounts 5 when they do not have to be differentiated.

The engine mounts 5 have a configuration similar to a typical hydraulic engine mount.

The engine mounts 6 and 7 are also typical hydraulic engine mounts.

In the description, the vertical direction with respect to the engine mounts 5 and the linear actuators 30 is the vertical direction of the engine mounts 5, which is illustrated in FIG. 2.

As illustrated in FIG. 2, the engine mounts 5 each include a cylindrical housing 20 having a vehicle-side attachment part 20a, which is a supporting-body-side attachment part attached to the corresponding frame 4a or 4b (see with the FIG. 1) through the attachment seat 10 with the bolt 11; a conical rubber elastic body 21 vulcanized to the outer circumference of the upper part of the housing 20; an engine-side attachment part 22 having an anchoring part that is vulcanized and buried in the apex of the elastic body 21; a holder 23 integrated with the housing 20 and joined with bolts 12 and nuts 13; and a stopper 24 made of rubber, which is an elastic member, and connected to the holder 23.

The holder 23 is rigidly attached to the frames 4a and 4b with the housing 20 and the attachment seats 10, without using the elastic body 21.

The engine mounts 5, which are hydraulic engine mounts, each include a diaphragm (not shown) having an elastic body 21 and an elastic member disposed below the elastic body 21 inside the housing 20, a main liquid chamber 25 containing liquid sealed by a partitioning member (not shown) disposed at an intermediate part between the elastic body 21 and the diaphragm and provided above the partitioning member, and a sub liquid chamber (not shown) provided on the lower side of the partitioning member.

The partitioning member has an orifice channel connecting the main liquid chamber 25 and the sub liquid chamber.

The engine-side attachment part 22, which is a vibrating-body attachment part, has a protruding part 22a protruding upward from the elastic body 21.

The protruding part 22a, which is a connecting part to which the corresponding connecting part 2a or 2b (see FIG. 1) are connected, is connected to the corresponding connecting part 2a or 2b with a bolt 14, which is a connecting unit.

In the engine mount 5A, the protruding part 22a and the connecting part 2a are disposed such that they overlap with the stopper 24 when viewed in the vertical direction. Thus, the protruding part 22a, the connecting part 2a, and the stopper 24 face each other in the vertical direction.

Similarly, in the engine mount 5B, the protruding part 22a and the connecting part 2b (see FIG. 1) are disposed such that they overlap with the stopper 24 in the vertical direction. Thus, the protruding part 22a, the connecting part 2b, and the stopper 24 face each other in the vertical direction.

The stopper 24, which opposes the protruding part 22a with a gap therebetween in the vertical direction, contacts at least one of the protruding part 22a and the corresponding connecting part 2a or 2b (see FIG. 1) to restrict excessive displacement of the corresponding connecting part 2a or 2b and prevent the engine 2 from vibrating at great amplitude during transient operation of the vehicle, such as acceleration or deceleration, and when a relatively large load, among variable loads from the road surface, is applied due to an evenness of the road surface.

Linear Actuator

The configuration of the linear actuators 30 will be described below mainly with reference to FIGS. 3 to 5 and occasionally with reference to FIGS. 1, 6, and 9.

Figure 3:
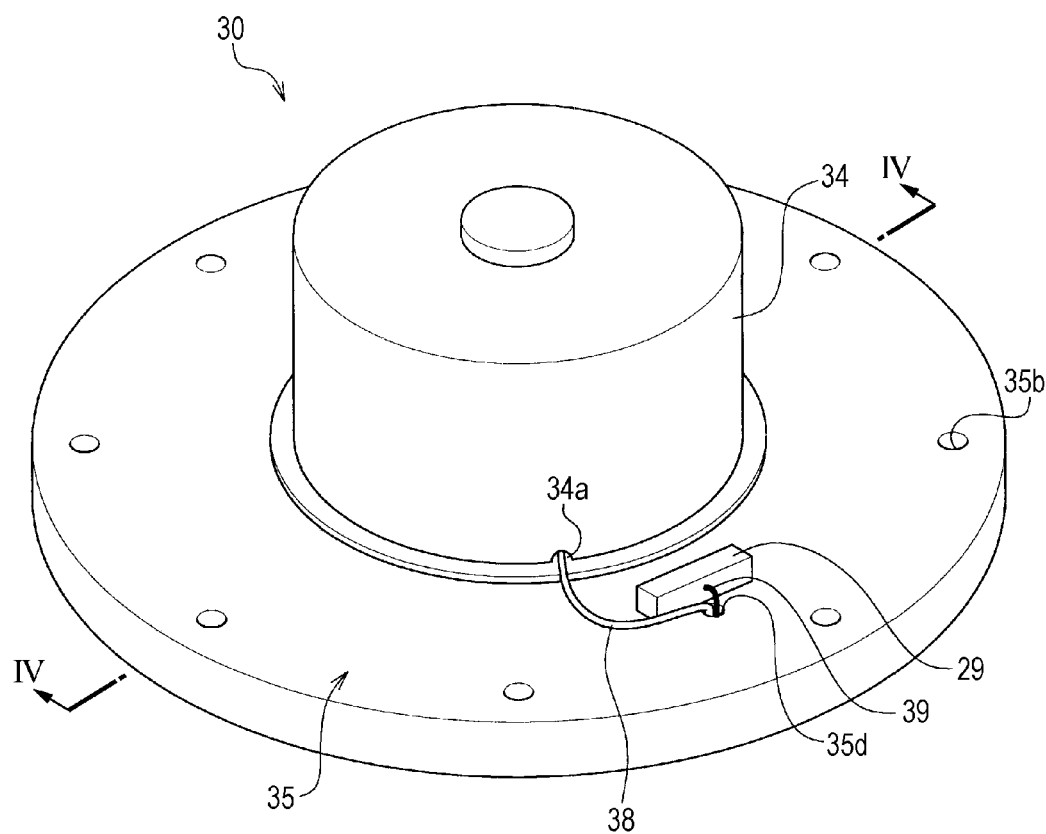
FIG. 3 is an external perspective view of a linear actuator.

FIG. 3 is an external perspective view of one of the linear actuators.

The main body of the linear actuator 30 is accommodated inside a cylindrical casing 34, which is secured on the upper surface of a base plate 35.

The vibration sensor 29 is secured on the base plate 35. The harness 38, which supplies power to the linear actuator 30, and the signal line 39 of the vibration sensor 29 are connected to a connector (not shown) on the lower surface of the base plate 35 through a vertical through-hole 35d in the base plate 35.

The harness 38, which supplies power to the linear actuator 30, leads outside from a small hole 34a in the lower part of the casing 34 and is guided to the through-hole 35d.

The linear actuator 30 is secured to the corresponding frame 4a or 4b (see FIG. 1) with bolts and nuts via bolt holes 35b in the base plate 35.

Figure 4:
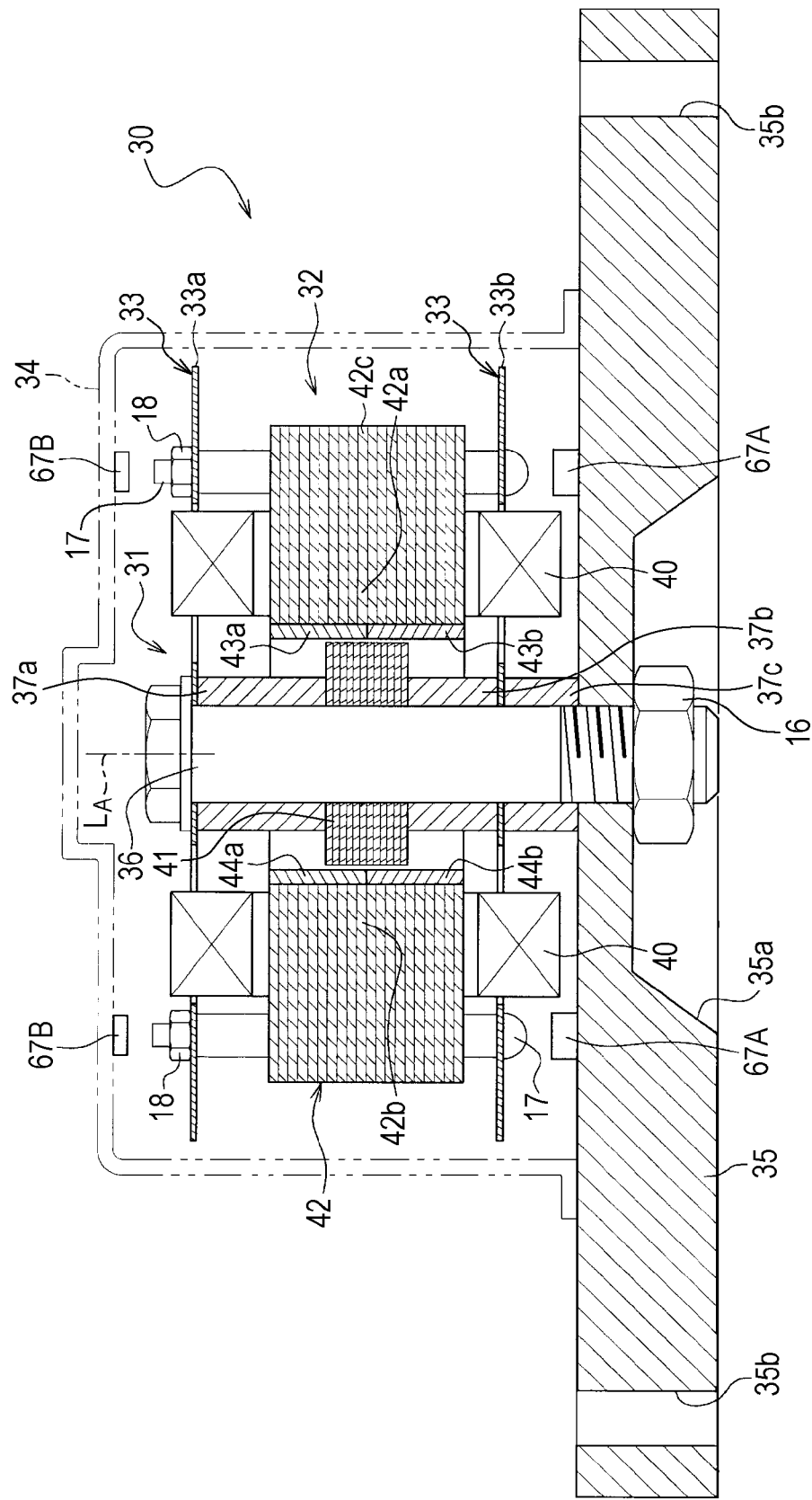
FIG. 4 is a sectional view taken along line IV-IV in FIG. 3.

FIG. 4 is a sectional view taken along line IV-IV in FIG. 3. FIG. 5 is a plan view of essential parts of the linear actuator.

In the vehicle body B (see FIG. 1), the linear actuator 30 mainly damps the vibration of the sub-frame 4 (see FIG. 1) including the first and second frames 4a and 4b (see FIG. 1) on which the engine mounts 5 (see FIG. 1) are attached.

Specifically, the linear actuator 30 generates damping vibration that cancels out the roll vibration generated at the engine 2 (see FIG. 1) and applies the damping vibration to the first and second frames 4a and 4b.

The linear actuator 30 includes a securing member 31, which is secured to the base plate 35, a movable member 32, which moves relative to the securing member 31, and a supporting member (elastic supporting member) 33, which supports the movable member 32 in such a manner that the movable member 32 moves relative to the securing member 31.

The securing member 31 includes a columnar shaft 36 as its main body secured to the base plate 35.

A screw portion of the shaft 36, which has an axis $L_A$ parallel to the vibrating direction of the damping vibration, is secured to the base plate 35 with a nut 16, which is a securing member.

In this embodiment, the axial direction, which is parallel to the vibrating direction and the axis LA, matches the vertical direction.

A depression 35a is formed in the lower surface of the base plate 35, where the nut 16 is attached to the base plate 35.

The linear actuator 30 includes a coil 40 that receives power from a driving circuit 53A (see FIG. 6) or a driving circuit 53B of the anti-vibration control ECU 50 to control displacement in the axial direction of the movable member 32 with the anti-vibration control ECU 50; a first yoke 41, which is ring-shaped and secured to the shaft 36 with sleeves 37a, 37b, and 37c, which are securing members; and a second yoke 42 surrounding the first yoke 41.

The second yoke 42 includes an outer circumferential surrounding part 42c surrounding the first yoke 41 and paired magnet parts 42a and 42c, which protrude from the surrounding part 42c toward the shaft 36 and have the coil 40 wound therearound.

A first permanent magnet 43a and a second permanent magnet 43b are attached to the magnet part 42a in series between the magnet part 42a and the shaft 36 along the axial direction. A third permanent magnet 44a and a fourth permanent magnet 44b are attached to the magnet part 42b in series between the magnet part 42b and the shaft 36.

The first and fourth permanent magnets 43a and 44b are magnetized such that the sides facing the shaft 36 across a gap are the N pole and the sides respectively attached to the magnet parts 42a and 42b are the S pole. The second and third permanent magnets 43b and 44b are magnetized such that the sides facing the shaft 36 across a gap are the S pole and the sides respectively attached to the magnet parts 42a and 42b are the N pole.

The supporting member 33 includes paired flat springs 33a and 33b, which are bendable members secured to the shaft 36 and the second yoke 42 and are disposed along the axis $L_A$ sandwiching the first yoke 41 and the second yoke 42 in the vertical direction.

The flat springs 33a and 33b are each secured to the shaft 36 on the inner circumferential side with the sleeve 37a, the first yoke 41, and the sleeves 37b and 37c and are secured to the second yoke 42 on the outer circumferential side with bolts 17 and nuts 18.

The shaft 36, the sleeves 37a, 37b, and 37c, and the first yoke 41 constitute the securing member 31. The securing member 31 is equivalent to the moving element according to the embodiment of the present invention.

The second yoke 42, the paired magnet parts 42a and 42b, the permanent magnets 43a, 43b, 44a, and 44b, and the coils 40 surrounding the magnet parts 42a and 42b constitute the movable member 32. The movable member 32 is equivalent to the secured element according to the embodiment of the present invention.

A variation in the magnetic flux generated by supplying to the coil 40 a current of which the orientation and intensity are controlled by the anti-vibration control ECU 50 causes a displacement of the second yoke 42 and the coil 40 in the axial direction of the shaft 36 with respect to the shaft 36 secured to the base plate 35, and as a result, damping vibration is generated. The damping vibration is transmitted to the first and second frames 4a and 4b (see FIG. 1) via the shaft 36 and the base plate 35 in the linear actuator 30.

Since the damping vibration is generated using the mass of the second yoke 42, the coil 40, and the permanent magnets 43a, 43b, 44a, and 44b, which are components of the linear actuator 30, the size of the linear actuator 30 can be reduced.

Rubber stoppers 67A, which are disposed on the upper surface of the base plate 35 inside the casing 34, prevent impact noise by contacting the head of the bolts 17 when the movable member 32 moves to the lowermost position in the vertical direction. Rubber toppers 67B, which are provided on the ceiling of the casing 34, prevent impact noise by contacting the ends of the bolts 17 when the movable member 32 moves to the uppermost position in the vertical direction.

The parts of the rubber stoppers 67A and 67B that contact the movable member 32 when the movable member 32 moves to the uppermost and lowermost positions are not limited to the head and end of the bolts 17. Instead, ring-shaped stoppers 67A and 67B may contact the movable member 32 at their outer circumferences disposed outside the bolts 17 of the flat springs 33a and 33b.

Figure 9A:
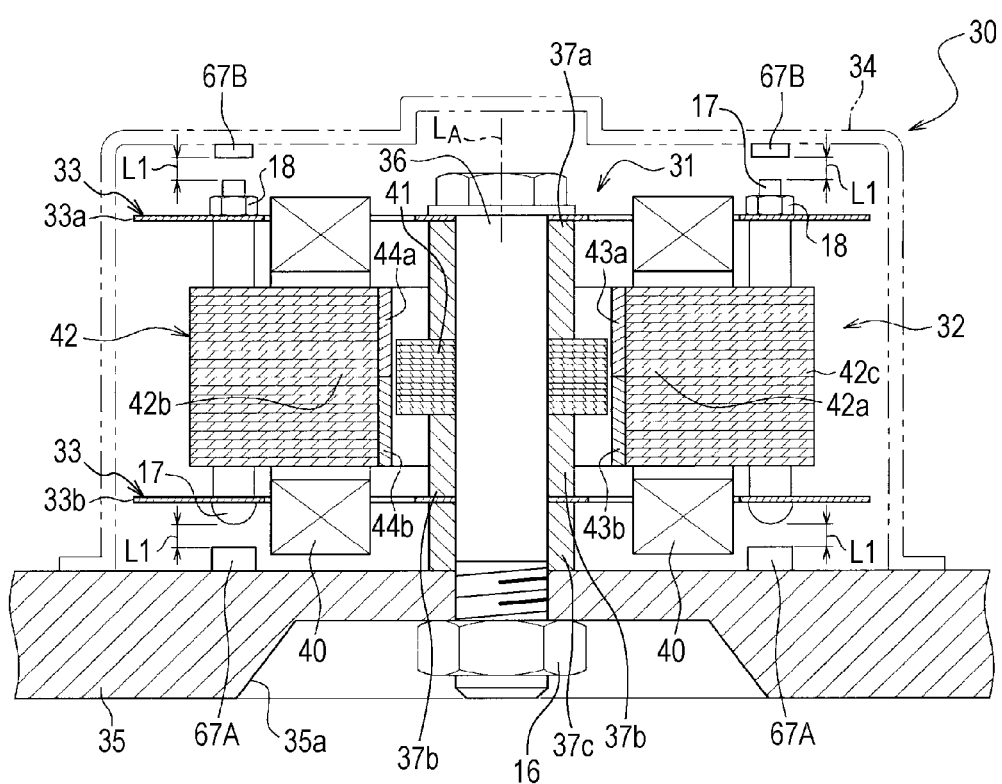
FIG. 9A illustrates a moving member in the linear actuator at a neutral position of relative displacement in the axial direction.

It is desirable that the distance between the flat spring 33a and each stopper 67B and the distance between the flat spring 33b and each stopper 67A be set to L1 when the flat springs 33a and 33b are not sagging as described below due to the weight of the movable member 32 and when the relative positions of the first yoke 41 and the second yoke 42 in the axial direction $L_A$ are neutral positions, as illustrated in FIG. 9A.

The vibration sensor 29 attached to the base plate 35 of the linear actuator 30 includes, for example, a capacitance-detecting acceleration sensor or a piezoresistive-element acceleration sensor.

When the engine 2 is displaced with respect to the first and second frames 4a and 4b and the engine mounts 5 when an inertial force, which is generated during transient operation of the vehicle, such as acceleration and deceleration, or a varying load, which is an external force from the road surface, is applied to the vibration sensor 29, the vibration sensor 29 detects the intensity of the dynamic load (which is equivalent to the vibration acceleration level) acting on the vibration sensor 29.

The vibration sensor 29 is disposed outside the casing 34 so as to prevent a temperature change, such as heating of the coil 40 of the linear actuator 30, due to the ambient temperature of the area where the vibration sensor 29 is disposed.

Anti-vibration Control ECU

The configuration of the anti-vibration control ECU 50 will be described with reference to FIG. 6 and occasionally with reference to FIG. 1.

Figure 6:
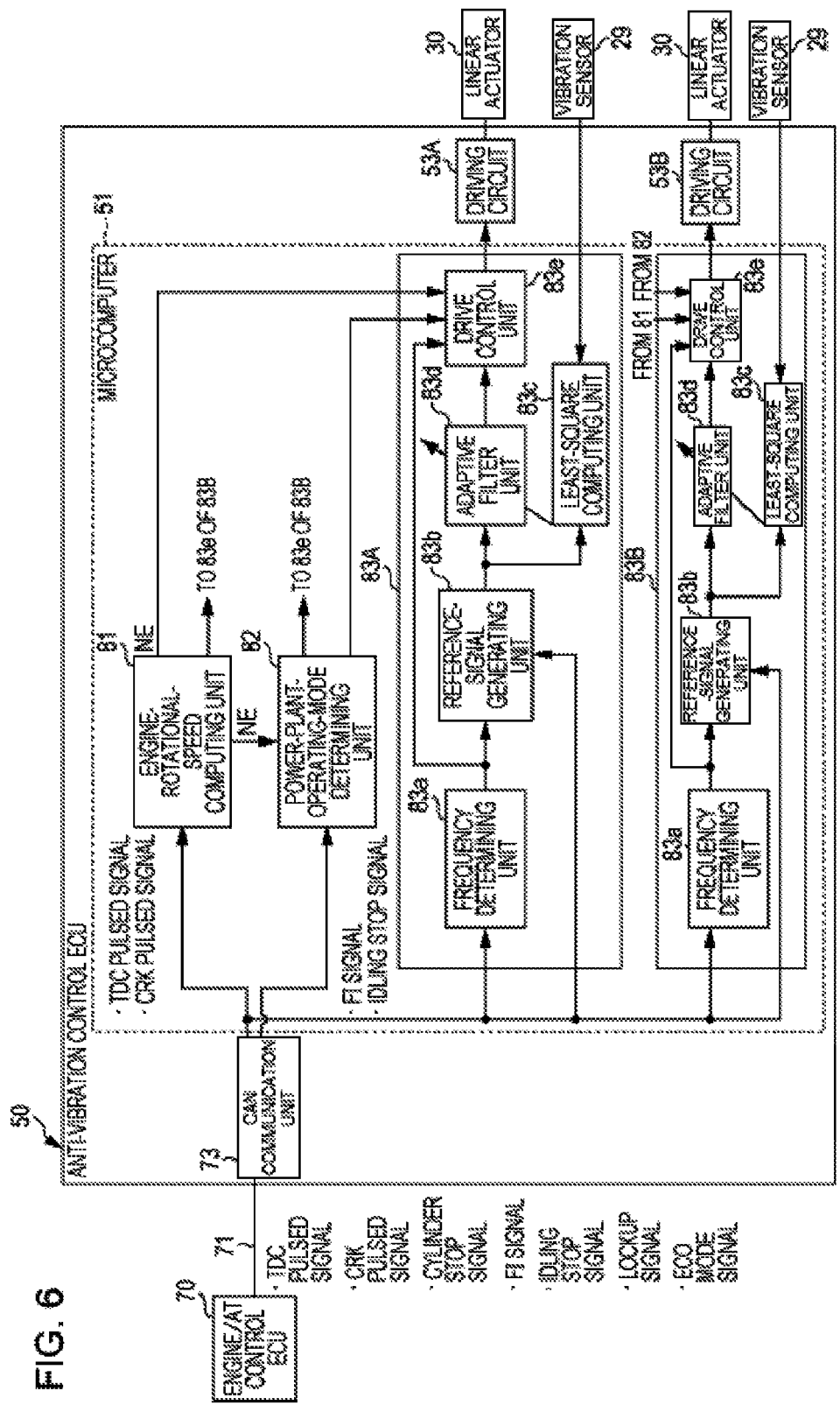
FIG. 6 is a functional configuration block diagram of an anti-vibration control ECU.

FIG. 6 is a functional configuration block diagram of an anti-vibration control ECU 50.

The anti-vibration control ECU 50 includes a microcomputer 51, the driving circuits 53A and 53B, and a CAN communication unit 73.

The microcomputer 51 includes a CPU, a ROM, a RAM, a bus, a clock circuit, an input/output interface, etc. Here, the term "microcomputer" is used in a broad sense, and the microcomputer 51 includes a digital signal processor (DSP) processing signals at high speed where the a least-square computing unit 83c and an adaptive filter unit 83d, which are functional components, perform computation.

By reading out programs stored in the ROM and executing these programs at the CPU, the functions of an engine-rotational-speed computing unit 81, a power-plant-operating-mode determining unit 82, and vibration-noise controlling units 83A and 83B are realized.

As the engine 2, for example, a six-cylinder vee engine may be used. Such six-cylinder vee engine may output a crank pulse signal, for example, every six degrees to the engine/AT control ECU 70, and the top dead center (TDC) sensor may output a TDC pulse signal indicating the position of the TDC of each cylinder to the engine/AT control ECU 70.

The vibration-noise controlling units 83A and 83B are constituted of the same functional blocks including a frequency determining unit 83a, a reference-signal generating unit 83b, a least-square computing unit 83c, an adaptive filter unit 83d and a drive control unit 83e.

The vibration-noise controlling units 83A and 83B each vibrate one of the linear actuators 30.

CAN Communication Unit

The CAN communication unit 73 of the anti-vibration control ECU 50 has a CAN communication control function and receives signals for the engine 2 from the engine/AT control ECU 70 via the CAN communication line 71, the signals including a TDC pulse signal indicating the timing of each cylinder reaching the TDC, a crank pulse signal (hereinafter referred to as "CRK pulse signal") output every predetermined angle, e.g., six degrees, of a crank angle, a cylinder-mode signal indicating whether the engine 2 is in an all-cylinder operating mode or a partial-cylinder operating mode, an FI signal indicating the fuel injection (FI) timing, a lockup signal indicating that a torque converter (not shown) inside the gearbox 9 (see FIG. 1) is in a lockup state, and an echo-mode signal, which is described above.

The CAN communication unit 73 sends, for example, a TDC pulse signal and a CRK pulse signal to the engine-rotational-speed computing unit 81, the frequency determining unit 83$a$ and the reference-signal generating unit 83$b$ of the vibration-noise control unit 83A, and the frequency determining unit 83$a$ and the reference-signal generating unit 83$b$ of the vibration-noise control unit 83B.

The CAN communication unit 73 sends an FI signal, a cylinder-mode signal, an idling-stop signal, a lockup signal, an echo-mode signal to the power-plant-operating-mode determining unit 82.

Engine-rotational-speed Computing Unit

The engine-rotational-speed computing unit 81 computes a rotational speed NE of the engine 2 (hereinafter referred to as "engine rotational speed NE") mainly on the basis of the CRK pulse signal and sends the computed engine rotational speed NE to the power-plant-operating-mode determining unit 82, the drive control unit 83$e$ of the vibration-noise control unit 83A, and the drive control unit 83$e$ of the vibration-noise control unit 83B.

Power-plant-operating-mode Determining Unit

The power-plant-operating-mode determining unit 82 determines the operating state of the engine 2 to be, for example, a motoring state at start-up of the engine 2, an idling state, an all-cylinder operating state, a partial cylinder operating state, or an idling stop state on the basis of the engine rotational speed NE input from the engine-rotational-speed computing unit 81, the FI signal, the cylinder-mode signal, the idling stop signal, the lockup signal, and the echo-mode signal input from the CAN communication unit 73, determines whether or not the torque converter of the gearbox 9 is in a lockup state, determines whether the shift control state of the gearbox 9 is in a normal mode or an echo mode, and inputs these results to the drive control unit 83$e$ of the vibration-noise controlling unit 83A and the drive control unit 83$e$ of the vibration-noise controlling unit 83B.

Vibration-noise Controlling Unit

The detailed configuration of the vibration-noise controlling units 83A and 83B will be described below.

Since the functional configuration of the vibration-noise controlling units 83A and 83B is the same, only the vibration-noise controlling unit 83A will be described.

Frequency Determining Unit

The frequency determining unit 83$a$ determines which vibration mode among the first-order vibration mode, 1.5-order vibration mode, second-order vibration mode, and third-order vibration mode yields the maximum amplitude on the basis of the TDC pulse signals and the CRK pulse signals (e.g., on the basis of a CRK pulse interval within a 120 degree crank-angle range), determines the frequency of the engine vibration in the vibration mode having the maximum amplitude, and outputs the results to the reference-signal generating unit 83$b$ as well as the drive control unit 83$e$.

Reference-signal Generating Unit

The reference-signal generating unit 83$b$ generates a reference signal, which is a sampling timing signal based on the timing of the TDC pulse signal, corresponding to the vibration in the vibration mode yielding the maximum amplitude determined by the frequency determining unit 83$a$.

That is, a reference signal for the determined vibration mode is frequency-divided.

The generated reference signal is input to the least-square computing unit 83$c$ and the adaptive filter unit 83$d$, which are functional units processed by the DSP.

When the engine mounts 5A and 5B are active anti-vibration mounts, the generated reference signal is input to the least-square computing unit 83$c$ via a phase-control filter.

In this embodiment, since the engine mounts 5A and 5B are not active anti-vibration mounts but are hydraulic anti-vibration mounts, the reference signal is input to the least-square computing unit 83$c$ without passing through a phase-control filter.

Least-square Computing Unit

The signal sent from the vibration sensor 29 to the vibration-noise control unit 83A contains, for example, a vibration component indicating the difference between the vibration transmitted from the engine 2 to the first frame 4$a$ (see FIG. 1) via the engine mount 5A and the vibration used to cancel out the vibration of the linear actuator 30 secured to the first frame 4$a$. This signal is input to the least-square computing unit 83$c$ of the vibration-noise control unit 83A.

The other signal sent from the vibration sensor 29 to the vibration-noise control unit 83B contains, for example, a vibration component indicating the difference between the vibration transmitted from the engine 2 to the second frame 4$b$ (see FIG. 1) via the engine mount 5B and the vibration used to cancel out the vibration of the linear actuator 30 secured to the second frame 4$b$. This signal is input to the least-square computing unit 83$c$ of the vibration-noise control unit 83B.

The least-square computing unit 83$c$ samples an input signal from the vibration sensor 29 in accordance with the sampling timing signal sent from the reference-signal generating unit 83$b$ to the least-square computing unit 83$c$, generates an optimal compensating signal that will provide the minimum least square for a predetermined period, i.e., the period corresponding to a 120 degree crank angle, and outputs the generated optimal compensating signal to the adaptive filter unit 83$d$.

Adaptive Filter Unit

The adaptive filter unit 83$d$ outputs the optimal compensating signal from the least-square computing unit 83$c$ to the drive control unit 83$e$ in accordance with the timing signal for sampling input from the reference-signal generating unit 83$b$ in the next period of 120 degrees.

Drive Control Unit

The drive control unit 83$e$ receives the engine rotational speed NE from the engine-rotational-speed computing unit 81, at least the cylinder-mode signal from the power-plant-operating-mode determining unit 82, and information about the frequency in the determined vibration mode from the frequency determining unit 83$a$.

Based on such information, a direct current component set in advance is added and multiplexed as a biased current to the optimal compensation signal for outputting an alternating current from the adaptive filter unit 83$d$ or an already added and multiplexed direct current component is demultiplexed, and then, the results are output to the driving circuit 53A.

At the drive control unit 83$e$ of the vibration-noise control unit 83B, a direct current component set in advance is added and multiplexed as a biased current to the optimal compensation signal for outputting an alternating current from the adaptive filter unit 83$d$ or an already added and multiplexed direct current component is demultiplexed, and then, the results are output to the driving circuit 53B.

Details of the control method of adding and multiplexing a direct current component as a biased current or demultiplexing an already added and multiplexed direct current component at the drive control unit 83e will be described below with reference to the flow chart in FIG. 7.

A method of controlling the application of a predetermined direct current to the linear actuator 30 by the anti-vibration control ECU 50 will be described with reference to FIGS. 7 to 9.

Figure 7:
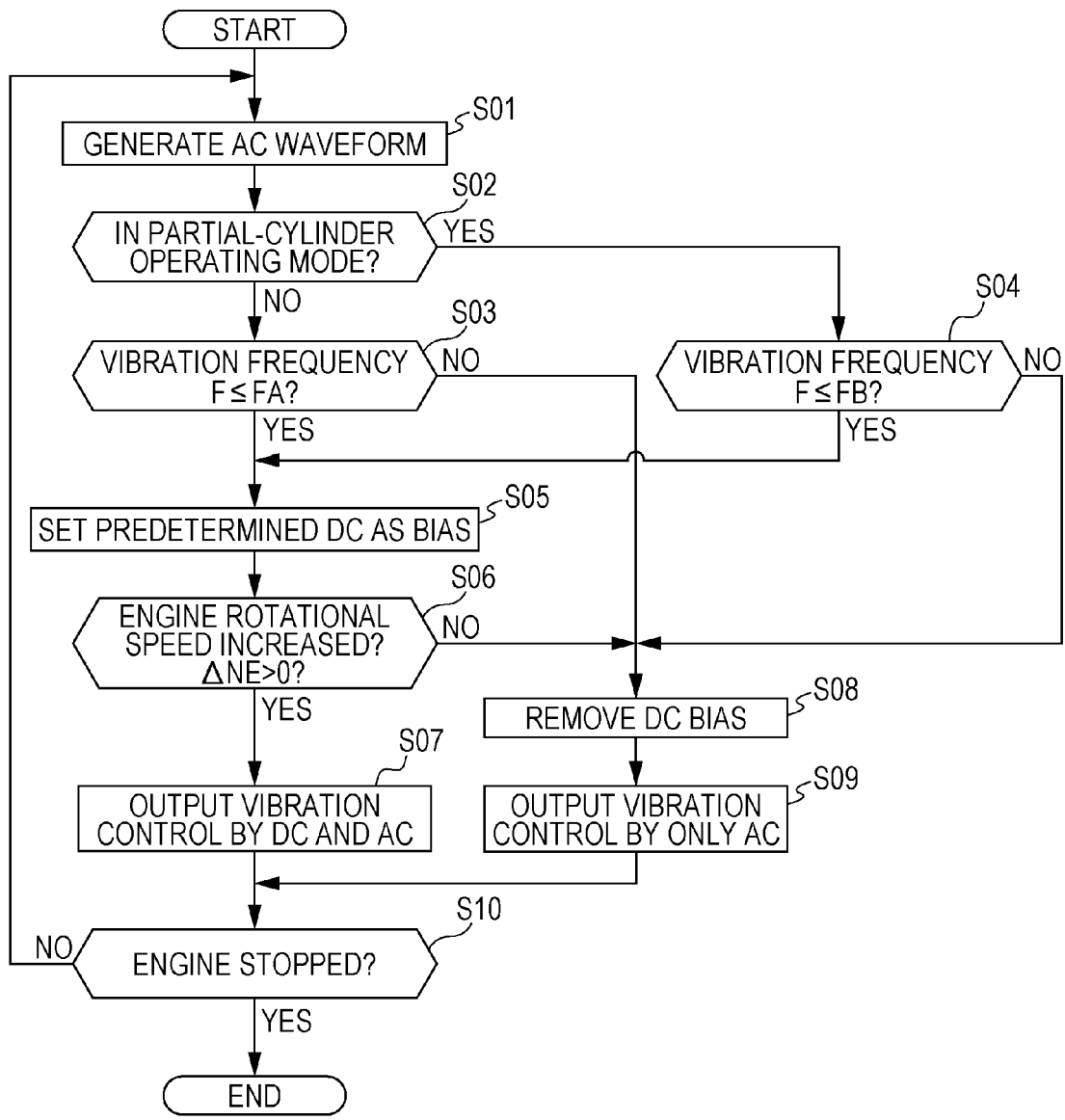
FIG. 7 is a flow chart illustrating the control flow performed by the anti-vibration control ECU to apply a predetermined direct current to the linear actuator.

FIG. 7 is a flow chart illustrating the control flow performed by the anti-vibration control ECU to apply a predetermined direct current to the linear actuator.

The control process illustrated in FIG. 7 is performed by the drive control unit 83e.

In Step S01, an alternating current waveform is generated on the basis of the optimal compensation signal input from the adaptive filter unit 83d ("generate AC waveform").

In Step S02, it is determined whether the signal indicating the engine-operating mode input from the power-plant-operating-mode determining unit 82 corresponds to a partial-cylinder operating mode.

When the signal corresponds to the partial-cylinder operating mode (YES), the process proceeds to Step S04, whereas, when the signal does not correspond to the partial-cylinder operating mode (NO), i.e., when the signal corresponds to the all-cylinder operating mode, the process proceeds to Step S03.

In Step S03, it is determined whether the frequency of the engine vibration in the vibration mode yielding the maximum amplitude input from the frequency determining unit 83a, i.e., the vibration frequency F of the linear actuator 30, is smaller than or equal to frequency FA (predetermined value).

When the vibration frequency F is smaller than or equal to the frequency FA (YES), the process proceeds to Step S05, whereas when the vibration frequency F exceeds the frequency FA (NO), the process proceeds to Step S08.

In Step S04, the frequency of the engine vibration in the vibration mode yielding the maximum amplitude input from the frequency determining unit 83a, i.e., the vibration frequency F of the linear actuator 30, is smaller than or equal to frequency FB (predetermined value).

When the vibration frequency F is smaller than or equal to the frequency FB (YES), the process proceeds to Step S05, whereas when the vibration frequency F exceeds the frequency FB (NO), the process proceeds to Step S08.

When the process proceeds to Step S05 from YES in Step S03 or S04, a predetermined direct current is set as a biased current if a predetermined direct current is not already set.

When a predetermined direct current is already set, the set predetermined direct current is used.

Step S05 in FIG. 7 is described as "set predetermined DC as bias."

In Step S06, it is determined whether the engine rotational speed has increased ($\Delta NE > 0$?) on the basis of the engine rotational speed NE input from the engine-rotational-speed computing unit 81, where $\Delta NE$ represents the difference between the previous engine rotational speed NE and the current engine rotational speed NE sampled in a predetermined cycle ($\Delta NE$=(current engine rotational speed NE)−(previous engine rotational speed NE)).

When the engine rotational speed is increased (YES), the process proceeds to Step S07, whereas when the engine rotational speed in not increased (NO), the process proceeds to Step S08.

In Step S07, the predetermined direct current set in Step S05 is added and multiplexed (applied and multiplexed) to the alternating current waveform set in Step S01 as a biased current, and the result is output to the driving circuit 53A or 53B ("output vibration control by DC and AC").

Then, the process proceeds to Step S10.

When the process proceeds to Step S08 from NO in Step S03, Step S04, or Step S06, the biased current setting is canceled when the predetermined direct current is set as a biased current in Step S05 in the previous repeated cycle, whereas nothing is done when the predetermined direct current is not set as a biased current ("remove DC bias").

In Step S09, the alternating current waveform set in Step S01 is output to the driving circuit 53A or 53B ("output vibration control by only AC").

Then, the process proceeds to Step S10.

In Step S10, it is determined whether the engine 2 has stopped on the basis of the engine rotational speed NE from the engine-rotational-speed computing unit 81.

When the engine 2 is stopped (YES), the current output control of the driving circuit 53A or 53B is stopped. Then, the control process ends.

When the engine 2 is not stopped (NO), the process returns to Step S01, and the control process is repeated.

Figure 8A:
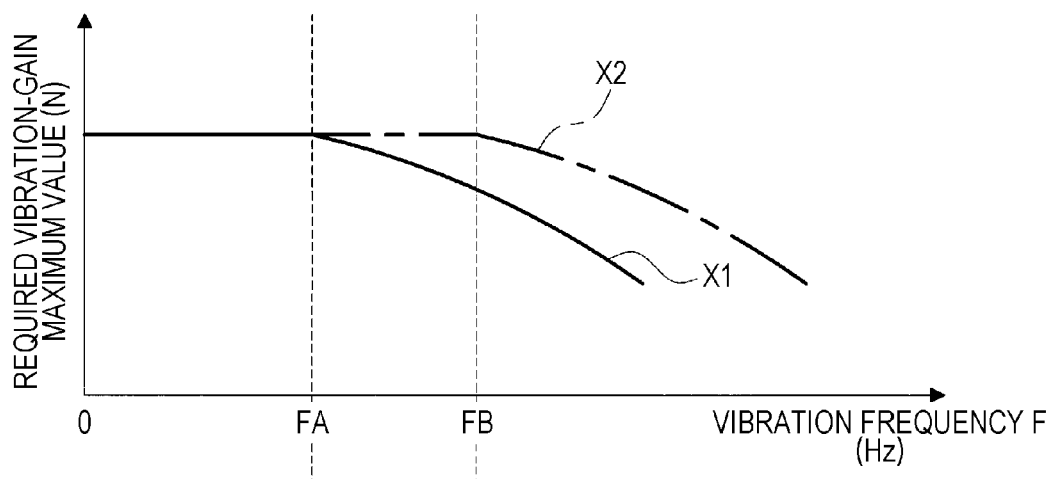
FIG. 8A illustrates the relationship between vibration frequency F of the linear actuator and the required vibration-gain maximum value.
Figure 8B:
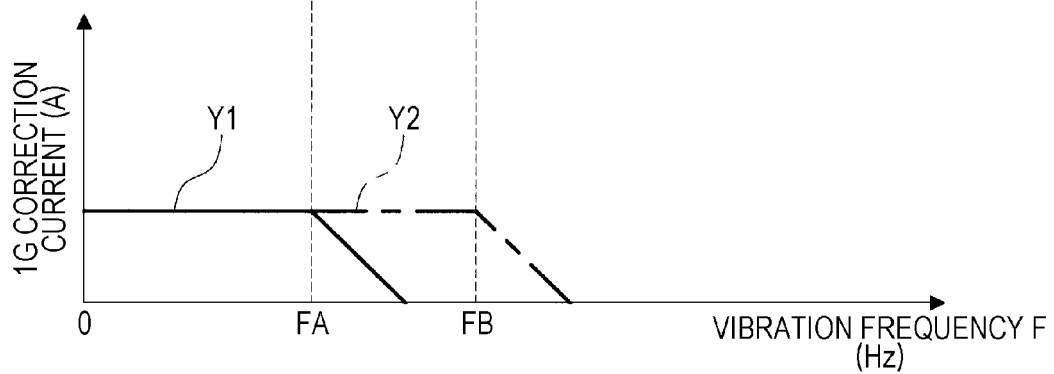
FIG. 8B illustrates the relationship between the vibration frequency F of the linear actuator and a frequency range in which a predetermined direct current is applied as a biased current.

FIG. 8A illustrates the relationship between the vibration frequency F of the linear actuator and the required vibration-gain maximum value. FIG. 8B illustrates the relationship between the vibration frequency F of the linear actuator and a frequency range in which a predetermined direct current is applied as a biased current.

Figure 9B:
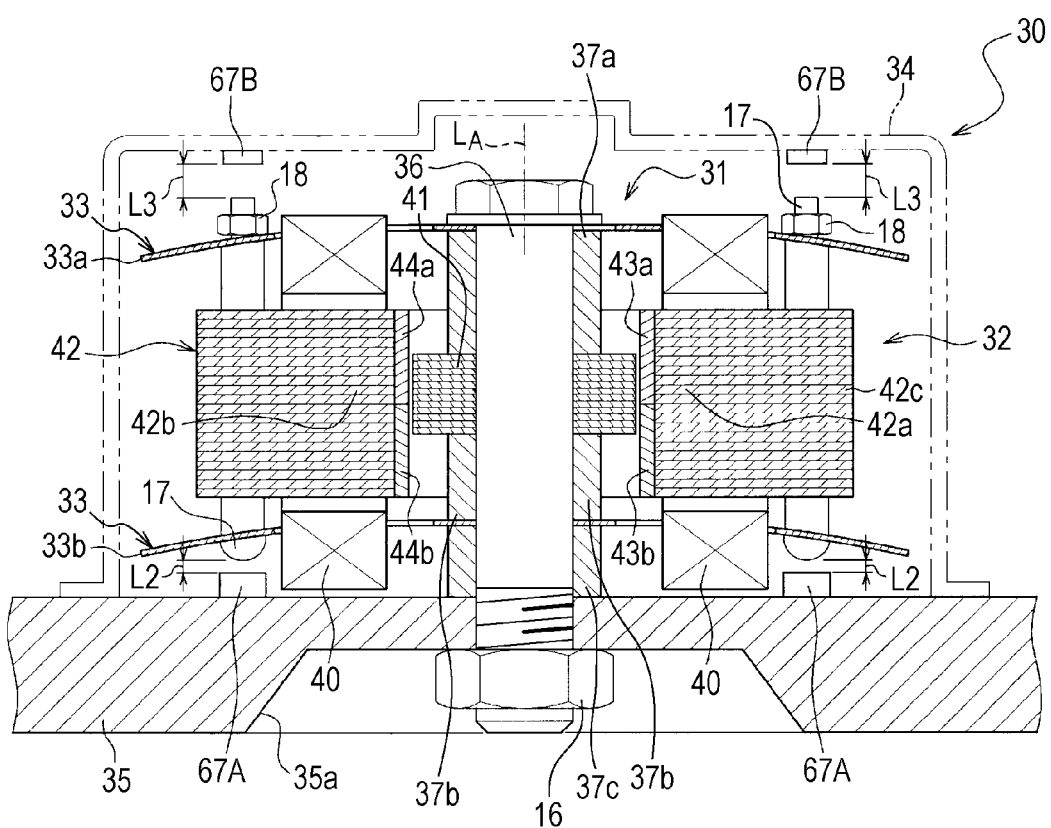
FIG. 9B illustrates the moving member of the linear actuator being positioned lower than the neutral position of the relative displacement in the axial direction due to its weight.

FIG. 9A illustrates the moving members in the linear actuator at neutral positions of relative displacement in the axial direction. FIG. 9B illustrates the moving members of the linear actuator being lower than the neutral positions of the relative displacement in the axial direction due to their own weight.

In FIG. 8A, the horizontal axis represents the vibration frequency F (Hz) of the linear actuator 30, and the vertical axis represents the required vibration-gain maximum value (unit: N) corresponding to the required maximum value of the vibration amplitude.

A curve X1 represents the required vibration-gain maximum value required for the linear actuator 30 in the all-cylinder operating mode. Once the frequency FA is exceeded, the required vibration-gain maximum value gradually decreases as the vibration frequency F increases.

In contrast, a curve X2 represents the required vibration-gain maximum value required for the linear actuator 30 in the partial-cylinder operating mode. Once the frequency FB, which is greater than the frequency FA, is exceeded, the required vibration-gain maximum value gradually decreases as the vibration frequency F increases.

In FIG. 8B, the horizontal axis represents the vibration frequency F (Hz) of the linear actuator 30, and the vertical axis represents the predetermined direct current (represented as "1G correction current (A)" in FIG. 8B) described in the flow chart in FIG. 7.

"1G" represents a state in which weight is applied to the movable member 32 (see FIG. 4). "1G correction current (A)" is the direct current set in advance, i.e., the direct current required for raising the center of the vibration to the neutral position in order to compensate for a decrease in the vibrational force when the amplitude of the linear actuator 30 is insufficient because vibration occurs with the actual amplitude center of the vertical vibration of the movable member 32 being lowered than the neutral position in the direction of the axis $L_A$ of the securing member 31 (see FIG. 4) and the movable member 32 when only an alternating current is applied to the coil 40 (see FIG. 4) when the weight of the movable member 32 is applied (i.e., in the state illustrated in FIG. 9B).

As illustrated in FIG. 9B, when an alternating current is applied to drive the linear actuator 30 when the movable member 32 is in a sagged initial position due to its own weight and the distance L3 between the flat springs 33a and each stoppers 67B is greater than the distance L2 between the flat springs 33b and each stopper 67A, even when the second yoke 42 is lowered, the flat springs 33b collide with the stoppers 67A with a small amplitude, resisting the downward movement of the second yoke 42. Accordingly, use of the amplitude cannot be maximized.

By applying the 1G correction current to the alternating current as a biased current in the frequency range in which the vibration frequency F is smaller than or equal to the frequency FA in the all-cylinder operating mode and in the frequency range in which the vibration frequency F is smaller than or equal to the frequency FB in the partial-cylinder operating mode, the position of the actual amplitude center of the vertical vibration of the movable member 32 is set to the neutral position in the axial direction $L_A$ of the securing member 31 (see FIG. 4) and the movable member 32, as illustrated in FIG. 9A. In this way, use of the amplitude can be maximized, and the vibrational force of the linear actuator 30 can be maximized.

The solid line Y1 in FIG. 8B represents the frequency range of the predetermined direct current applied to the coil 40 (see FIG. 4) of the linear actuator 30 in the all-cylinder operating mode. When the vibration frequency F exceeds frequency FA, the predetermined current is set to zero with a time constant that does not generate vibration at the linear actuator 30.

In contrast, the dashed line Y2 represents the frequency range of the predetermined direct current applied to the coil 40 of the linear actuator 30 in the partial-cylinder operating mode. When the vibration frequency F exceeds the frequency FB, the predetermined current is set to zero with a time constant that does not generate vibration at the linear actuator 30.

According to this embodiment, by controlling the current output from the driving circuits 53A and 53B to the linear actuators 30 by the drive control unit 83e in accordance with the flow chart in FIG. 7, the lowering of the amplitude center of the vibration of the movable member 32 (see FIG. 4) due to its own weight is compensated for such that the vertical vibration of the movable member 32 is centered at the neutral position in the axial direction of the securing member 31 (see FIG. 4) in the vibration frequency range having a large required vibration-gain maximum value for the linear actuator 30, as illustrated in FIG. 8A. Accordingly, a sufficient and effective vibrational force can be ensured.

In the vibration frequency range in which the required vibration-gain maximum value gradually decreases, since the amplitude of the required vibration is small, the linear actuator 30 can output a sufficient vibrational force without applying a bias of a predetermined direct current even though the center position of the vibration gradually is lowered.

In the vibration frequency range in which the required vibration-grain maximum value gradually decreases, power consumption can be reduced by not applying a predetermined direct current.

First Variation

In the linear actuator 30 according to this embodiment, as illustrated in FIG. 4, the upper part of the shaft 36 is a free end. Instead, however, the rigidity of the casing 34 may be increased to enable the bolt of the shaft 36 to be passed through the top of the casing 34 to maintain a certain distance between the sub-frame 33a and the lower surface of the top of the casing 34 with a gap member and be secured between the casing 34 and the base plate 35 with the nut 16.

Figure 5:
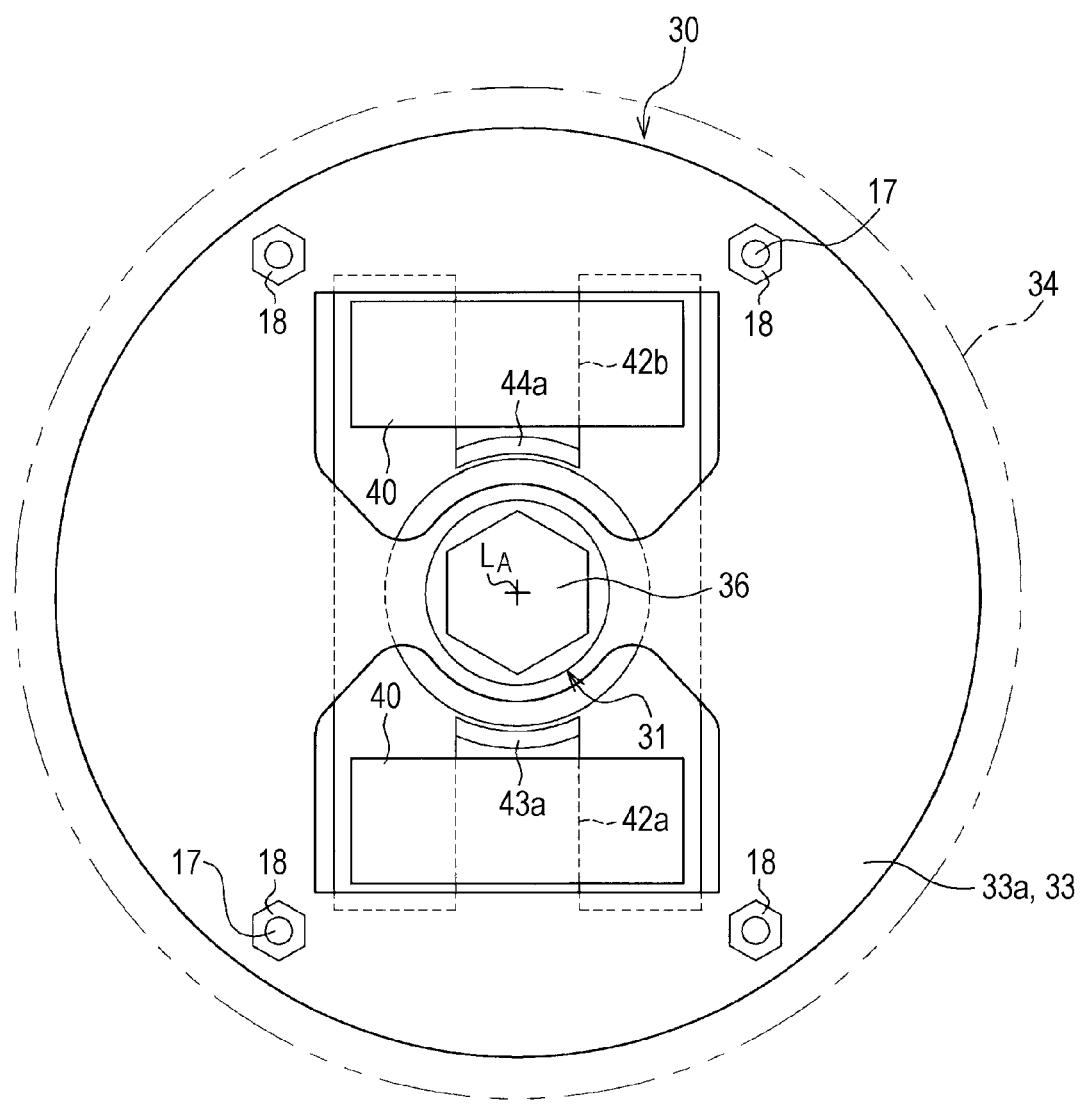
FIG. 5 is a plan view of essential parts of the linear actuator.

The configuration of the linear actuator 30 is not limited to that illustrated in FIGS. 4 and 5.

A linear actuator described in Japanese Unexamined Patent Application Publication No. 2006-345652 may be used.

Second Variation

In this embodiment, as illustrated in FIGS. 4 and 5, the movable member 32 is held by the flat springs 33a and 33b in the axial direction, but the configuration is not limited thereto.

Instead, a plurality of coil springs may be disposed in the circumferential direction between the base plate 35 and the lower surface of the second yoke 42 and between the ceiling of the casing 34 and the upper surface of the second yoke 42 such that the movable member 32 can be displaced in the vertical direction relative to the securing member 31.

Third Variation

In this embodiment, the securing member 31 of the linear actuator 30 is secured to the base plate 35. The configuration, however, is not limited thereto. Instead, the movable member 32 may be secured to the base plate 35 with the bolts 17 and the nuts 18, and the securing member 31 may be supported by the flat springs 33a and 33b, without being secured to the base plate 35, in such a manner that the securing member 31 moves in the vertical direction relative to the movable member 32.

The securing member 31 and the movable member 32 can be displaced in the axial direction relative to each other. With reference to the configuration of a typical linear actuator, it is customary to refer to the securing member 31 as "moving element" and the movable member 32 as "secured element" in the embodiment of the present invention.

Fourth Variation

In this embodiment, as illustrated in FIGS. 7 and 8, the power-plant-operating-mode determining unit 82 determines whether the engine 2 in the all-cylinder operating mode or the partial-cylinder operating mode and sets the frequency by adding and multiplexing a predetermined direct current component to the alternating current waveform generated in Step S01. This, however, is not limited thereto.

The control of applying the predetermined direct current to a linear actuator by an anti-vibration control ECU 50 according to a fourth variation of this embodiment will be described below.

The power-plant-operating-mode determining unit 82 determines whether the engine/AT control ECU 70 is carrying out speed shift control of the gearbox 9 in the echo mode or the normal mode on the basis of whether the echo mode signal is received through CAN communication, determines whether or not the torque converter of the gearbox 9 is in a lockup state on the basis of whether a lockup signal is received through CAN communication, and, in each case, adds and multiplexes the predetermined direct current to the alternating current waveform in accordance with whether the direct current is smaller than or equal to the predetermined vibration frequency, which is set in accordance with the operating mode of the engine 2, i.e., the all-cylinder operating mode or the partial-cylinder mode.

Determining whether the engine/AT control ECU 70 is carrying out speed shift control of the engine mount 7 in the echo mode or the normal mode, determining whether or not the torque converter of the gearbox 9 is in a lockup state, and determining whether the engine operating mode is the all-cylinder operating mode or the partial-cylinder operating mode are equivalent to "determining the operating mode in a power plant" according to the embodiment of the present invention.

In the echo mode, the vibration frequency range in which the predetermined direct current is added and multiplexed to the AC waveform is set in consideration that, for example, in the normal mode, the range of increase and decrease of the engine rotational speed during speed shift control of the gearbox while accelerating or decelerating tends to be smaller than that in the normal mode, and the vibration amplitude of the engine vibration transmitted to the vehicle body during speed shift control of the gearbox tends to be larger than that during the speed shift control of the gearbox in the normal mode.

Compared to when the torque convert is not in a lockup state, when the torque converter is in a lockup state, the vibration frequency range in which the predetermined direct current is added and multiplexed to the AC waveform is set in consideration that the torque variation vibration absorption of the engine 2 by the torque converter is not effective when the engine vibration is transmitted to the vehicle body B and the vibration amplitude of the entire power plant transmitted to the vehicle body B tends to increase because the mass of the vibrating body is considered to be part of the engine 2 and the gearbox 9 because the torque variation is transmitted to the gearbox 9 by directly transmitting the rotation of the engine 2 to the gearbox 9.

This variation will be described in detail below with reference to FIGS. 10, 11, and 7.

Figure 10:
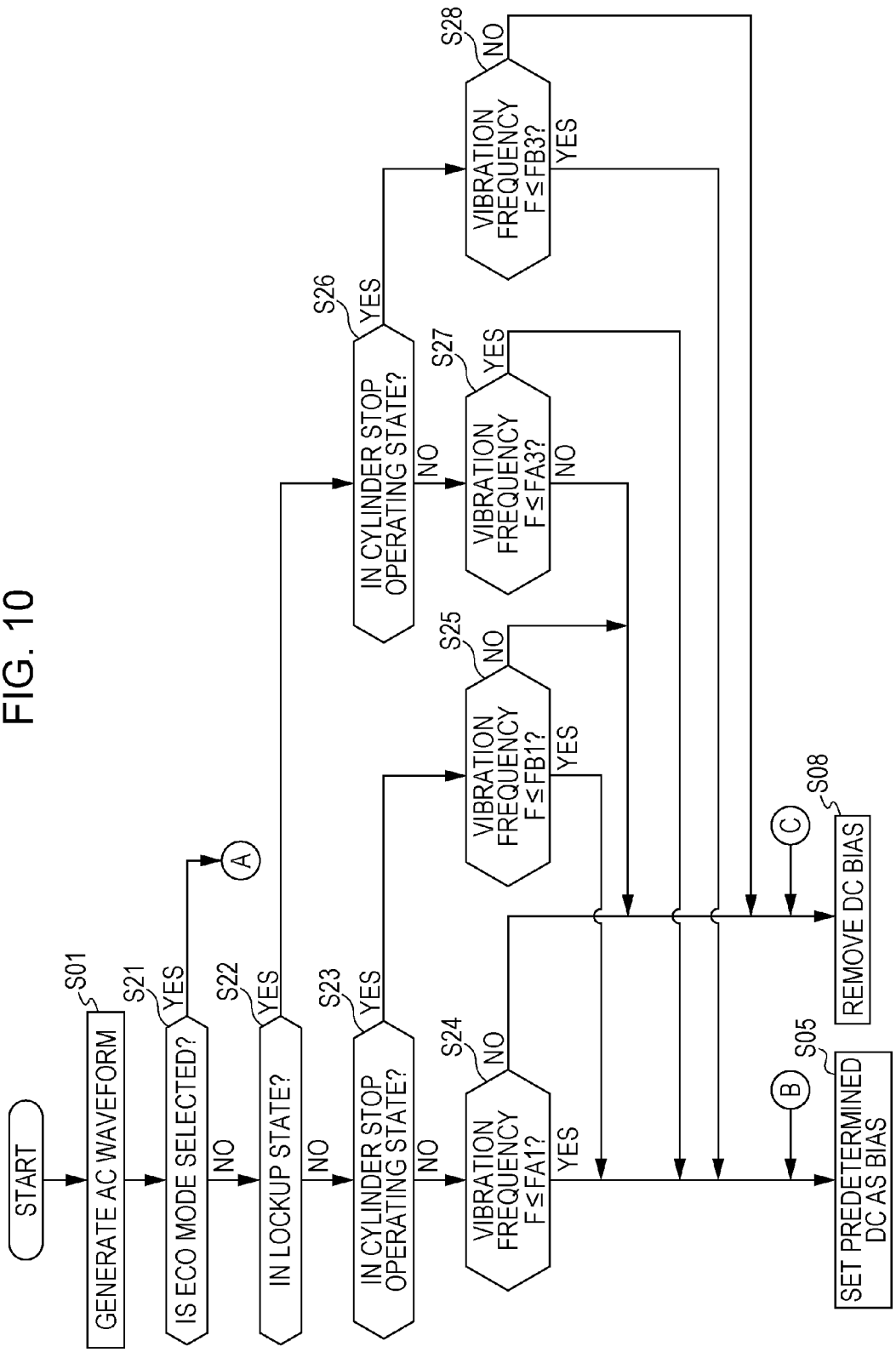
FIG. 10 is a flow chart illustrating the control flow performed by an anti-vibration control ECU according to a fourth variation of an embodiment to apply a predetermined direct current to the linear actuator, the flow chart including the steps that differ from those in the flow chart in FIG. 7.
Figure 11:
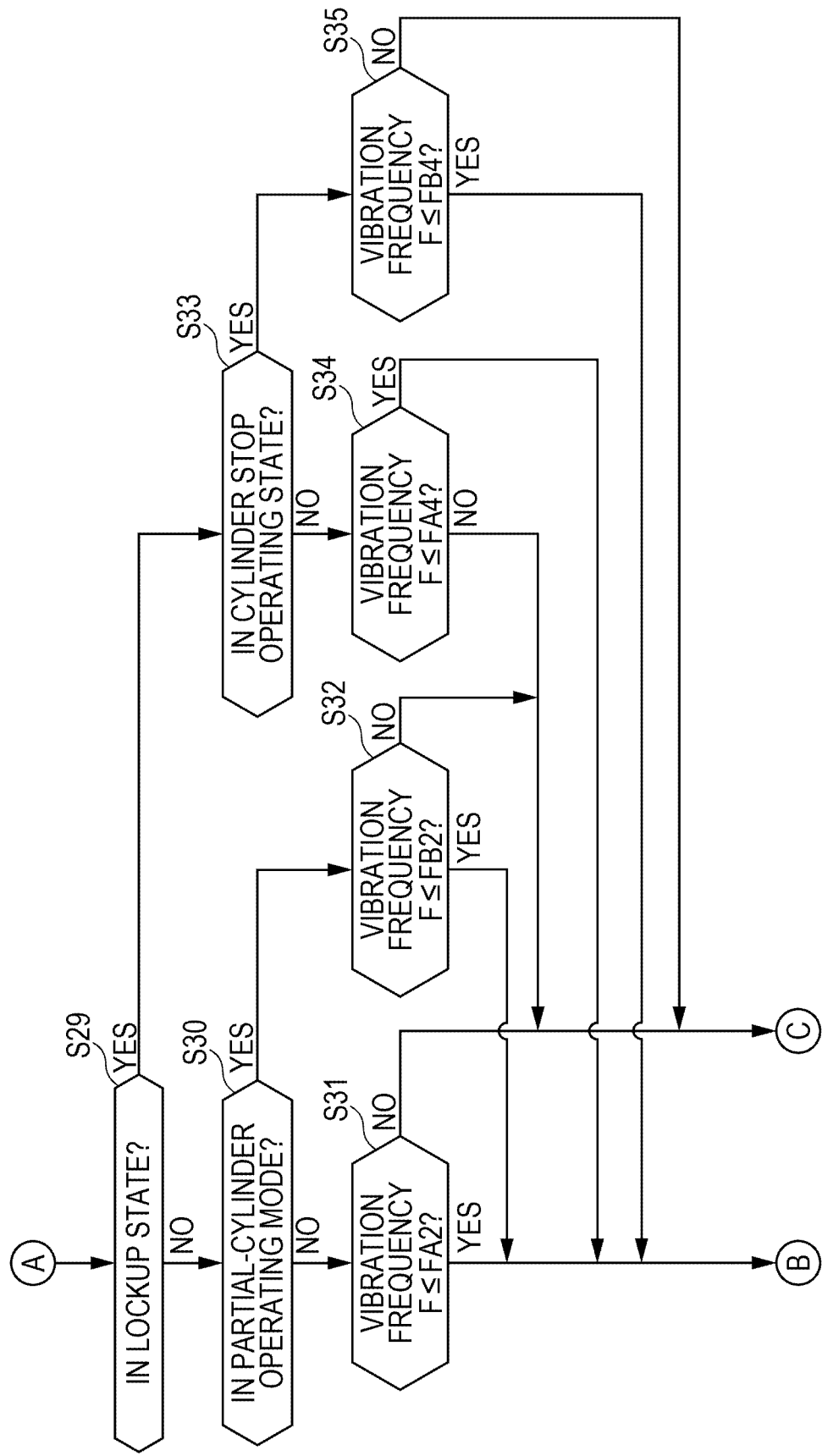
FIG. 11 is a flow chart continuing from FIG. 10.

FIGS. 10 and 11 are flow charts illustrating the control flow performed by the anti-vibration control ECU 50 according to a fourth variation of this embodiment to apply a predetermined direct current to the linear actuator, the flow charts including the steps that differ from those in the flow chart in FIG. 7.

The control process illustrated in the flow charts in FIGS. 10 and 11 are performed by the drive control unit 83e.

In Step S01, an alternating current waveform is generated on the basis of the optimal compensation signal input from the adaptive filter unit 83d ("generate AC waveform").

Then, the process proceeds to Step S21 to determine whether the echo mode is selected for any of the signals corresponding to the engine operating mode input from the power-plant-operating-mode determining unit 82 ("Is echo mode selected?").

When the echo mode is selected (YES), the process proceeds to Step S29 in FIG. 11 as indicated by the character A. When the echo mode is not selected (NO), i.e., when the normal mode is selected, the process proceeds to Step S22.

In Step S22, it is determined whether any of the signals corresponding to the engine operating mode input from the power-plant-operating-mode determining unit 82 corresponds to a lockup state of the torque converter.

When a signal is in a lockup state (YES), the process proceeds to Step S26, whereas when no signal is in a lockup state (NO), the process proceeds to Step S23.

In step S23, it is determined whether the signal corresponding to the engine operating mode input from the power-plant-operating-mode determining unit 82 corresponds to the partial-cylinder operating mode.

When the signal is in a partial-cylinder operating mode (YES), the process proceeds to Step S25, whereas when the signal is not in the partial-cylinder operating mode, i.e., in the all-cylinder operating mode, the process proceeds to Step S24.

In Step S24, it is determined whether the frequency of the engine vibration in the maximum amplitude vibration mode input from the frequency determining unit 83a, i.e., the vibration frequency F of the linear actuator 30, is smaller than or equal to a frequency FA1 (predetermined value).

When the vibration frequency F is smaller than or equal to the frequency FA1 (YES), the process proceeds to Step S05 in FIG. 7, whereas when the vibration frequency F exceeds the frequency FA1 (NO), the process proceeds to Step S08 in FIG. 7.

In Step S25, it is determined whether the frequency of the engine vibration in the maximum amplitude vibration mode input from the frequency determining unit 83a, i.e., the vibration frequency F of the linear actuator 30, is smaller than or equal to a frequency FB1 (predetermined value).

When the vibration frequency F is smaller than or equal to the frequency FB1 (YES), the process proceeds to Step S05 in FIG. 7, whereas when the vibration frequency F exceeds the frequency FB1 (NO), the process proceeds to Step S08 in FIG. 7.

When the process proceeds to Step S26 from YES in Step S22, it is determined whether the signal corresponding to the engine operating mode input from the power-plant-operating-mode determining unit 82 corresponds to the partial-cylinder operating mode.

When the signal is in a partial-cylinder operating mode (YES), the process proceeds to Step S28, and when the signal is not in the partial-cylinder operating mode, i.e., when the signal is in the all-cylinder operating mode, the process proceeds to Step S27.

In Step S27, it is determined whether the vibration frequency F at the linear actuator 30 input from the frequency determining unit 83a is smaller than or equal to a frequency FA3 (predetermined value).

When the vibration frequency F is smaller than or equal to the frequency FA3 (YES), the process proceeds to Step S05 in FIG. 7, whereas when the vibration frequency F exceeds the frequency FA3 (NO), the process proceeds to Step S08 in FIG. 7.

In Step S28, it is determined whether the vibration frequency F at the linear actuator 30 input from the frequency determining unit 83a is smaller than or equal to a frequency FB3 (predetermined value).

When the vibration frequency F is smaller than or equal to the frequency FB3 (YES), the process proceeds to Step S05 in FIG. 7, whereas when the vibration frequency F exceeds the frequency FB3 (NO), the process proceeds to Step S08 in FIG. 7.

In step S21, when the process proceeds to Step S29 in FIG. 11 as indicated by the character A, it is determined whether any of the signals corresponding to the engine operating mode input from the power-plant-operating-mode determining unit 82 corresponds to a lockup state of the torque converter.

When the signal corresponds to a lockup state (YES), the process proceeds to Step S33, whereas when the signal does not correspond to a lockup state, the process proceeds to Step S30.

In Step S30, it is determined whether the signal corresponding to the engine operating mode input from the power-plant-operating-mode determining unit 82 corresponds to a partial-cylinder operating mode.

When the signal is in a partial-cylinder operating mode (YES), the process proceeds to Step S32, and when the signal is not in the partial-cylinder operating mode, i.e., when the signal is in the all-cylinder operating mode, the process proceeds to Step S31.

In Step S31, it is determined whether the vibration frequency F at the linear actuator 30 input from the frequency determining unit 83a is smaller than or equal to frequency FA2 (predetermined value).

When the vibration frequency F is smaller than or equal to the frequency FA2 (YES), the process proceeds to Step S05 in FIG. 7 as indicated by the character B, whereas when the vibration frequency F exceeds the frequency FA2 (NO), the process proceeds to Step S08 in FIG. 7 as indicated by the character C.

In Step S32, it is determined whether the vibration frequency F at the linear actuator 30 input from the frequency determining unit 83a is smaller than or equal to frequency FB2 (predetermined value).

When the vibration frequency F is smaller than or equal to the frequency FB2 (YES), the process proceeds to Step S05 in FIG. 7 as indicated by the character B, whereas when the vibration frequency F exceeds the frequency FB2 (NO), the process proceeds to Step S08 in FIG. 7 as indicated by the character C.

When the process proceeds to Step S33 from YES in step S29, it is determined whether the signal corresponding to the engine operating mode input from the power-plant-operating-mode determining unit 82 is in a partial-cylinder operating mode.

When the signal is in a partial-cylinder operating mode (YES), the process proceeds to Step S35, whereas when the signal is not in the partial-cylinder operating mode, i.e., when the signal is in the all-cylinder operating mode, the process proceeds to Step S34.

In Step S34, it is determined whether the vibration frequency F at the linear actuator 30 input from the frequency determining unit 83a is smaller than or equal to frequency FA4 (predetermined value).

When the vibration frequency F is smaller than or equal to the frequency FA4 (YES), the process proceeds to Step S05 in FIG. 7 as indicated by the character B, whereas when the vibration frequency F exceeds the frequency FA4 (NO), the process proceeds to Step S08 in FIG. 7 as indicated by the character C.

In Step S35, it is determined whether the vibration frequency F at the linear actuator 30 input from the frequency determining unit 83a is smaller than or equal to frequency FB4 (predetermined value).

When the vibration frequency F is smaller than or equal to the frequency FB4 (YES), the process proceeds to Step S05 in FIG. 7 as indicated by the character B, whereas when the vibration frequency F exceeds the frequency FB4 (NO), the process proceeds to Step S08 in FIG. 7 as indicated by the character C.

The relationship of the values of the predetermined frequencies FA1, FA2, FA3, and FA4 is, for example, FA1<FA2<FA3<FA4; the relationship of the predetermined frequencies FB1, FB2, FB3, and FB4 is, for example, FB1<FB2<FB3<FB4; and there is a relationship of FA1<FB1, FA2<FB2, FA3<FB3, and FA4<FB4.

In this way, a predetermined direct current is applied and multiplexed to the linear actuator 30 as a bias in a vibration frequency range smaller than or equal to a predetermined frequency corresponding to the power plant operating mode, without applying and multiplexing a predetermined direct current as a bias in a vibration frequency range exceeding a predetermined frequency corresponding to the power plant operating mode, and thus, unnecessary power consumption can be prevented.

Depending on the model, a vehicle may have a sports mode, in addition to the normal mode and the echo mode, in which the gearbox 9 is shifted up or shifted down by increasing the variation width of the engine rotational speed so that acceleration and deceleration can be sensed more prominently.

In such a case, in contrast to the echo mode, for example, when shifting up, the engine rotational speed increases compared with the normal mode, the frequency is set to a predetermined frequency FA5 (FA4<FA5) in the all-cylinder operating mode in which the sports mode and lockup state are combined.

In the sports mode, a partial-cylinder operation is no selected.

Fifth Variation

Additionally, when the power-plant-operating-mode determining unit 82 receives an idling stop signal through the CAN communication and detects that the engine 2 is in the idling stop state, even the engine 2 stops, at least for a predetermined amount of time, e.g., until a traffic light changes to green, a predetermined direct current may be continuously applied as a bias at the drive control unit 83e and the linear actuator 30 may enter a stand-by state such that maximum use of the amplitude is possible to prevent the transmission of vibration to the vehicle body B when the engine is restarted.

According to the embodiment of the present invention, since the center position of the amplitude of the vibration due to relative displacement of the moving element and the secured element in the axial direction can be corrected by applying and multiplexing a predetermined direct current set in advance as a biased current when the linear actuator satisfies a predetermined vibration condition, the vibration amplitude can be increased by applying the predetermined direct current as a biased current when the amplitude of the vibration due to relative displacement of the moving element and the secured element in the axial direction is to be increased.

Specifically, maximum use of the amplitude is possible by preventing vibration control of the linear actuator causes the center position of the amplitude of the vibration of the moving element and the secured element in the axial direction to move downward when an alternating current is applied while the moving element or the secured element is displaced downward due to its own weight.

According to the embodiment of the present invention, the predetermined vibration condition of the linear actuator may be to set a frequency of the vibration of the linear actuator cancelling out vibration generated by an engine is smaller than or equal to a predetermined value, the engine being a vibrating body mounted on a vehicle.

The amplitude of the vibration of the engine mounted on the vehicle transmitted to the vehicle body via an engine mount is known to gradually decrease as the frequency of the transmitted vibration increases.

Thus, according to the embodiment of the present invention, only when the frequency of the vibration of the linear actuator for cancelling out the vibration transmitted from the engine, which is a vibrating body mounted on the vehicle, is smaller than or equal to a predetermined value, a predetermined direct current is applied and multiplexed as a biased current to correct the center position of the amplitude of the vibration due to relative displacement of the moving element and the secured element so as to ensure maximized use of the amplitude of the vibration of the linear actuator.

As a result, the use of the amplitude of the linear actuator can be maximized when the frequency of the vibration transmitted from the engine to the vehicle body is smaller than or equal to a predetermined value, and when the vibration transmitted from the engine to the vehicle body exceeds the predetermined value and the amplitude is small, a predetermined direct current is not applied to and multiplexed with the linear actuator as a biased current, preventing unnecessary power consumption.

The embodiment of the present invention may further include a vibration sensor detecting vibration of the body of the vehicle, the vibration being the sum of the vibration transmitted from the vibrating body and vibration of the linear actuator, wherein the control unit may control the linear actuator in accordance with a signal from the vibration sensor.

According to the embodiment of the present invention, since a vibration sensor detecting vibration of the body of the vehicle, which is the sum of the vibration transmitted from the vibrating body and vibration of the linear actuator, is further included and the control unit controls the linear actuator in accordance with a signal from the vibration sensor, for example, an active vibration control device having a control unit that applies an adaptive digital filter according to Japanese Unexamined Patent Application Publication No. 6-74293 to the control unit to gradually decrease the vibration generated at the vibrating body and reduce the vibration can effectively and gradually reduce the vibration of a vehicle body by detecting remaining vibration, which is the result of cancelling out vibration transmitted from the vibrating body with vibration of the linear actuator, with a vibration sensor and effectively controlling the operation of the adaptive digital filter.

According to the embodiment of the present invention, the control unit may include a power-plant-operating-mode determining unit determining the operating mode of a power plant including an engine and a gearbox mounted on a vehicle and may change a region smaller than or equal to a predetermined frequency of the vibration of the linear actuator receiving and being multiplexed with the predetermined direct current set in advance as a biased current in accordance with the operating mode of the power plant determined by the power-plant-operating-mode determining unit.

The amplitude of the frequency of the vibration transmitted to the vehicle body differs depending on the operating mode of the power plant including an engine and a gearbox mounted on the vehicle.

Thus, according to the embodiment of the present invention, since a region smaller than or equal to a predetermined frequency of the vibration of the linear actuator receiving and being multiplexed with the predetermined direct current set in advance as a biased current in accordance with the operating mode of the power plant determined by the power-plant-operating-mode determining unit can be changed, the use of the amplitude of the linear actuator can be maximized when the frequency of the vibration transmitted from the power plant to the vehicle body is smaller than or equal to a predetermined value, and when the vibration transmitted from the power plant to the vehicle body exceeds the predetermined value and the amplitude is small, a predetermined direct current is not applied to and multiplexed with the linear actuator as a biased current, preventing unnecessary power consumption.

In the embodiment of the present invention, to determine the operating mode of the power plant it is desirable to include at least one of determining an all-cylinder operating mode or a partial-cylinder operating mode, determining a lockup state of a torque converter included in a gearbox connected to the engine and a non-lockup state of the torque converter, and determining a state of a control input setting of a control device controlling shift change of the gearbox being set to a normal mode and a state of the control input setting being set to an echo mode of shifting up the gearbox when the rotational speed of the engine is smaller than the rotational speed in the normal mode.

For example, it has been confirmed that in an all-cylinder operating mode of the engine, the amplitude of the engine vibration transmitted to the vehicle body decreases as the frequency increases in a frequency range exceeding first vibration frequency of the engine, whereas, in a partial-cylinder operating mode in which part of the engine cylinders are not operating, the amplitude of the engine vibration transmitted to the vehicle body decreases as the frequency increases in a frequency range exceeding second vibration frequency, which is greater than the first vibration frequency of the engine.

Thus, in a vibration frequency range lower than or equal to the first vibration frequency or the second vibration frequency set in advance in accordance with the engine operating mode, which is determined to be either the all-cylinder operating mode or the partial-cylinder operating mode by the power-plant-operating-mode determining unit, a predetermined direct current is applied to and multiplexed with the actuator as a biased current, whereas in a vibration frequency range exceeding the first vibration frequency or the second vibration frequency set in advance in accordance with the engine operating mode, a predetermined direct current is not applied to and not multiplexed with the actuator as a biased current, preventing unnecessary power consumption.

Compared to when the torque convert included in the gearbox is not in a lockup state, when the torque converter is in a lockup state, the torque variation vibration absorption of the engine by the torque converter is not effective when the engine vibration is transmitted to the vehicle body and the vibration amplitude of the entire power plant transmitted to the vehicle body tends to increase because the mass of the vibrating body is considered to be part of the engine and the gearbox because the torque variation is transmitted to the gearbox by directly transmitting the rotation of the engine to the gearbox.

Thus, in a vibration frequency range lower than or equal to the first vibration frequency or the second vibration frequency set in advance in accordance with the state of the torque converter, which is determined to be either a lockup state or non-lockup state by the power-plant-operating-mode determining unit, a predetermined direct current is applied to and multiplexed with the actuator as a biased current, whereas in a vibration frequency range exceeding the first vibration frequency or the second vibration frequency set in advance in accordance with the engine operating mode, a predetermined direct current is not applied to and not multiplexed with the actuator as a biased current, preventing unnecessary power consumption.

There is a known engine/automatic transmission (AT) control electric control circuit (ECU) controlling the engine and the gearbox in which the gearbox is an automatic gearbox; after the driver setting the select lever to the drive range, the driving torque is estimated on the basis of the engine rotational speed, the throttle-valve position sensor, and the shift position; the change in depression of the accelerator pedal by the driver is detected with an accelerator position sensor; and there are vehicles known to automatically shift gear differently in a normal mode and an echo mode.

In the echo mode, the shift position of the engine is shifted up at a smaller engine rotational speed compared with that in the normal mode. When the echo-mode selection button on the instrument panel is pressed by the driver to select the echo mode, the shift position is automatically changed with a variation range of the engine rotational speed that is smaller than that in the normal mode.

Thus, when the echo mode is selected, for example, the amount of increase in the engine rotational speed when shifting gear during acceleration tends to be small and the amplitude of the vibration of the engine transmitted to the vehicle body tends to be great, compared with when gear is shifted in the normal mode.

Thus, in a vibration frequency range lower than or equal to the first vibration frequency or the second vibration frequency set in advance in accordance with the operating mode, which is determined to be either the echo mode or the normal mode by the power-plant-operating-mode determining unit, a predetermined direct current is applied to and multiplexed with the actuator as a biased current, whereas in a vibration frequency range exceeding the first vibration frequency or the second vibration frequency set in advance in accordance with the engine operating mode, a predetermined direct current is not applied to and not multiplexed with the actuator as a biased current, preventing unnecessary power consumption.

The embodiment of the present invention provides an active vibration control apparatus prevents continuous unnecessary power consumption and enables use of maximum amplitude of the linear actuator.

Obviously, numerous modifications and variations of the present invention are possible in light of the above teachings. It is therefore to be understood that within the scope of the appended claims, the invention may be practiced otherwise than as specifically described herein.

What is claimed is:

1. An active vibration control apparatus comprising:
   a linear actuator comprising:
      a moving element;
      a stator having a plurality of coils surrounding the moving element; and
      an elastic support supporting the moving element to be reciprocally movable relative to the stator in an axial direction of the moving element due to elastic deformation of the elastic support; and
   a controller configured to apply an alternating current to the stator to generate vibration due to relative displacement of the moving element and the stator in the axial direction, the controller being configured to correct a center position of an amplitude of the vibration by additionally applying a predetermined direct current as a biased current to the stator when the linear actuator satisfies a predetermined vibration condition.

2. The active vibration control apparatus according to claim 1, wherein the vibration of the linear actuator cancels out vibration generated by an engine, the engine being a vibrating body mounted on a vehicle, and wherein the predetermined vibration condition of the linear actuator is to set a frequency of the vibration of the linear actuator being smaller than or equal to a reference frequency.

3. The active vibration control apparatus according to claim 2, further comprising:
   a vibration sensor to detect vibration of a vehicle body, the vibration of the vehicle body being a sum of vibration transmitted from the vibrating body and the vibration of the linear actuator, wherein the controller controls the linear actuator in accordance with a signal from the vibration sensor.

4. The active vibration control apparatus according to claim 2, wherein the controller includes a power-plant-operating-mode determining device to determine the operating mode of a power plant including the engine and a gearbox mounted on the vehicle, and changes the reference frequency in accordance with the operating mode of the power plant determined by the power-plant-operating-mode determining device.

5. The active vibration control apparatus according to claim 4, wherein a determination of the operating mode of the power plant by the power-plant-operating-mode determining device includes at least one of following determinations: a determination of an all-cylinder operating mode or a partial-cylinder operating mode; a determination of a lockup state of a torque converter included in a gearbox connected to the engine or a non-lockup state of the torque converter; and a determination of a state of a control input setting of a control device controlling shift change of the gearbox being set to a normal mode or a state of the control input setting being set to an echo mode that shifts up the gearbox when a rotational speed of the engine is smaller than the rotational speed in the normal mode.

6. The active vibration control apparatus according to claim 1, wherein the predetermined direct current raises a center of the vibration of the linear actuator to substantially a center of a vertical displacement range.

* * * * *